US012615230B2

(12) United States Patent
Zhou et al.

(10) Patent No.: US 12,615,230 B2
(45) Date of Patent: *Apr. 28, 2026

(54) ENHANCING ONLINE CONTENTS BASED ON DIGITAL ALLIANCE DATA

(71) Applicant: Project Affinity, Inc., San Francisco, CA (US)

(72) Inventors: Ray Zhou, San Francisco, CA (US); Bobby Zhang, San Francisco, CA (US); Gabriel Fan, Mountain View, CA (US); Hansen Qian, San Francisco, CA (US); Craig Dabney, San Francisco, CA (US); Shubham Goel, San Francisco, CA (US); Andrew Luo, Los Altos, CA (US)

(73) Assignee: Project Affinity, Inc., San Francisco, CA (US)

( * ) Notice: Subject to any disclaimer, the term of this patent is extended or adjusted under 35 U.S.C. 154(b) by 112 days.

This patent is subject to a terminal disclaimer.

(21) Appl. No.: 18/793,670

(22) Filed: Aug. 2, 2024

(65) Prior Publication Data

US 2025/0039121 A1      Jan. 30, 2025

Related U.S. Application Data

(63) Continuation of application No. 18/478,863, filed on Sep. 29, 2023, now Pat. No. 12,058,093, which is a
(Continued)

(51) Int. Cl.
*H04L 51/52*          (2022.01)
*G06Q 10/107*          (2023.01)
(Continued)

(52) U.S. Cl.
CPC ........... *H04L 51/52* (2022.05); *G06Q 10/107* (2013.01); *H04L 67/025* (2013.01); *H04L 67/306* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 7,730,216 B1 | 6/2010 | Issa et al. | |
| 8,386,619 B2 | 2/2013 | Mallet et al. | |

(Continued)

OTHER PUBLICATIONS

U.S. Appl. No. 16/799,310, filed Feb. 24, 2020.
(Continued)

*Primary Examiner* — Raqiul A Choudhury
(74) *Attorney, Agent, or Firm* — Duane Morris LLP

(57) ABSTRACT

One or more non-transitory storage media storing instructions which, when executed by one or more processors, cause performance of a method of enhancing online contents based on digital alliance data are disclosed. The method comprises obtaining at least a portion of a webpage at a first user device associated with a first user and a first user account managed by a communication data management server, the webpage being a digital communication between a first communication account of the first user and a second communication account of a second user; determining an organization associated with the second communication account; identifying one or more members or contacts of an alliance network of the first user account that are associated with the organization; updating the webpage with specific data regarding the one or more members or contacts of the alliance network.

20 Claims, 23 Drawing Sheets

Related U.S. Application Data continuation of application No. 18/091,271, filed on Dec. 29, 2022, now Pat. No. 11,799,819, which is a continuation of application No. 17/472,584, filed on Sep. 11, 2021, now Pat. No. 11,552,922, which is a continuation of application No. 16/228,107, filed on Dec. 20, 2018, now Pat. No. 11,153,255.

(51) Int. Cl.

| | |
|---|---|
| *G06Q 50/00* | (2024.01) |
| *H04L 67/025* | (2022.01) |
| *H04L 67/306* | (2022.01) |

(56) References Cited

U.S. PATENT DOCUMENTS

| | | | |
|---|---|---|---|
| 8,392,526 | B2 | 3/2013 | Mallet et al. |
| 8,473,386 | B2 | 6/2013 | Altberg et al. |
| 8,539,086 | B2 | 9/2013 | Mallet et al. |
| 8,745,488 | B1 | 6/2014 | Wong |
| 8,880,600 | B2 | 11/2014 | Lento et al. |
| 8,880,609 | B2 | 11/2014 | Mallet et al. |
| 8,930,459 | B2 | 1/2015 | Mallet et al. |
| 8,935,332 | B2 | 1/2015 | Mallet et al. |
| 8,954,506 | B2 | 2/2015 | Mallet et al. |
| 8,959,153 | B2 | 2/2015 | Mallet et al. |
| 8,972,501 | B2 | 3/2015 | Mallet et al. |
| 9,094,506 | B2 | 7/2015 | Altberg et al. |
| 9,252,976 | B2 | 2/2016 | Olsen et al. |
| 9,363,283 | B1 | 6/2016 | Herrera-Yage et al. |
| 9,477,940 | B2 | 10/2016 | Abernethy, Jr. et al. |
| 9,665,584 | B2 | 5/2017 | Jayaram et al. |
| 9,858,348 | B1 | 1/2018 | Higgins et al. |
| 2004/0122803 | A1 | 6/2004 | Dom et al. |
| 2006/0167942 | A1 | 7/2006 | Lucas et al. |
| 2008/0070593 | A1 | 3/2008 | Altman et al. |
| 2011/0119593 | A1 | 5/2011 | Jacobson et al. |
| 2011/0246574 | A1 | 10/2011 | Lento et al. |
| 2011/0289106 | A1 | 11/2011 | Rankin, Jr. et al. |
| 2012/0323909 | A1 | 12/2012 | Behforooz et al. |
| 2013/0211980 | A1 | 8/2013 | Heiferman et al. |
| 2013/0297652 | A1 | 11/2013 | Higgins et al. |
| 2013/0305170 | A1 | 11/2013 | de Souza et al. |
| 2014/0053081 | A1* | 2/2014 | Struhl .................... H04L 51/48 |
| | | | 715/752 |
| 2014/0165178 | A1 | 6/2014 | Perrone, II et al. |
| 2014/0297631 | A1 | 10/2014 | Jayaram et al. |
| 2014/0297748 | A1 | 10/2014 | Mauney et al. |
| 2014/0297749 | A1 | 10/2014 | Jayaram et al. |
| 2014/0298204 | A1 | 10/2014 | Jayaram et al. |
| 2015/0149319 | A1* | 5/2015 | Pattani .................. G06Q 50/01 |
| | | | 705/26.8 |
| 2015/0150093 | A1* | 5/2015 | Hsieh ..................... H04L 63/08 |
| | | | 715/205 |
| 2016/0012465 | A1 | 1/2016 | Sharp |
| 2016/0267497 | A1 | 9/2016 | Li et al. |
| 2017/0147155 | A1 | 5/2017 | Krishnamoorthy et al. |
| 2018/0014199 | A1 | 1/2018 | Chen |
| 2018/0183811 | A1* | 6/2018 | Mokhinuddeen ... H04L 63/0892 |
| 2018/0225474 | A1* | 8/2018 | McReynolds .......... H04W 4/12 |
| 2019/0273627 | A1 | 9/2019 | Whalin et al. |
| 2019/0311439 | A1* | 10/2019 | Quintana ................ H04L 67/10 |
| 2019/0327277 | A1 | 10/2019 | Zhou et al. |
| 2020/0195698 | A1 | 6/2020 | Zhou et al. |
| 2020/0204515 | A1 | 6/2020 | Zhou et al. |

OTHER PUBLICATIONS

U.S. Appl. No. 16/285,988, filed Feb. 26, 2020.
U.S. Appl. No. 15/959,145, filed Apr. 20, 2018.
U.S. Appl. No. 16/215,534, filed Dec. 10, 2018.
U.S. Appl. No. 16/395,119, filed Apr. 25, 2019.

* cited by examiner

FIG. 2

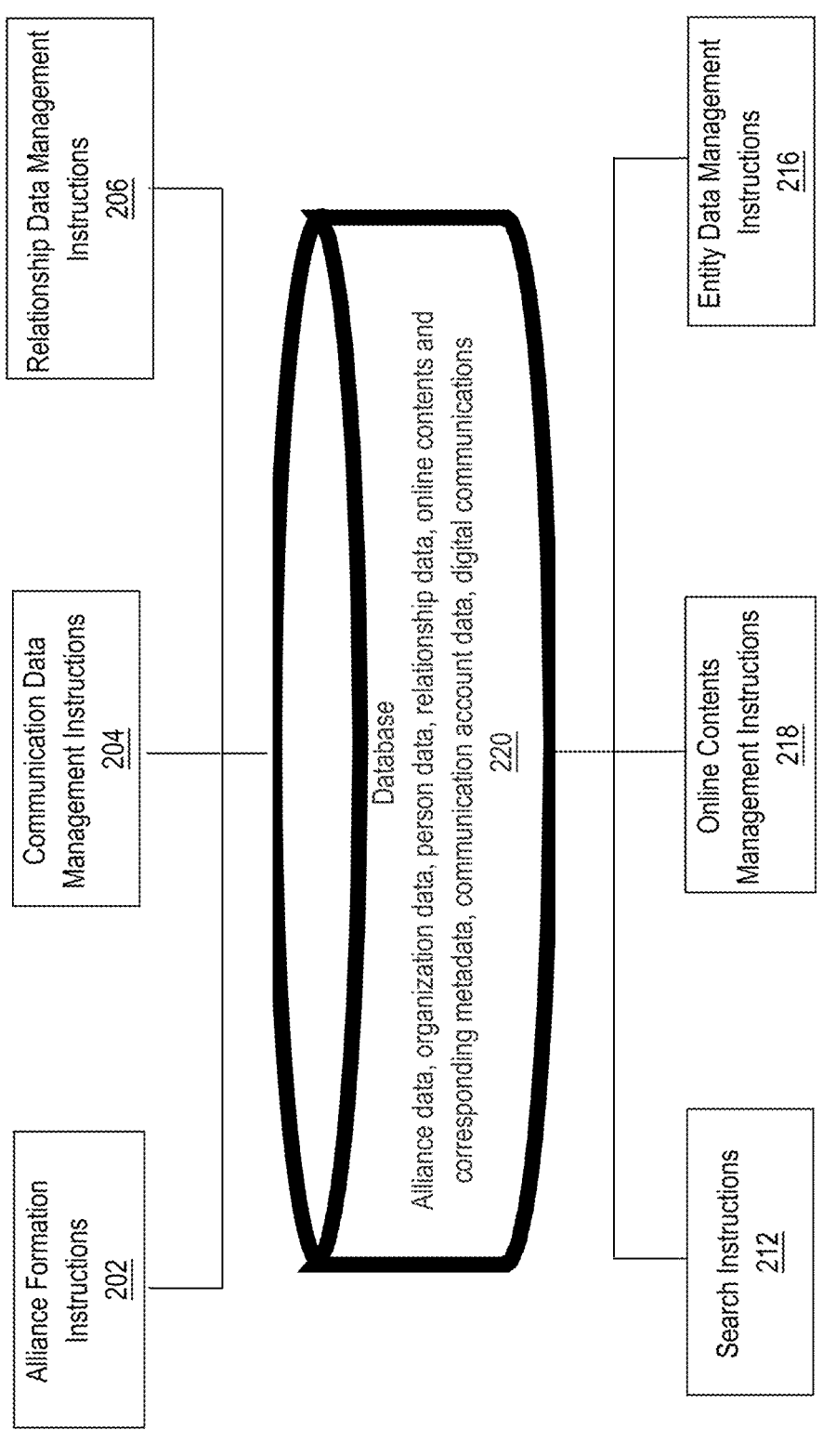

Alliance Formation Instructions 202

Communication Data Management Instructions 204

Relationship Data Management Instructions 206

Database

Alliance data, organization data, person data, relationship data, online contents and corresponding metadata, communication account data, digital communications 220

Search Instructions 212

Online Contents Management Instructions 218

Entity Data Management Instructions 216

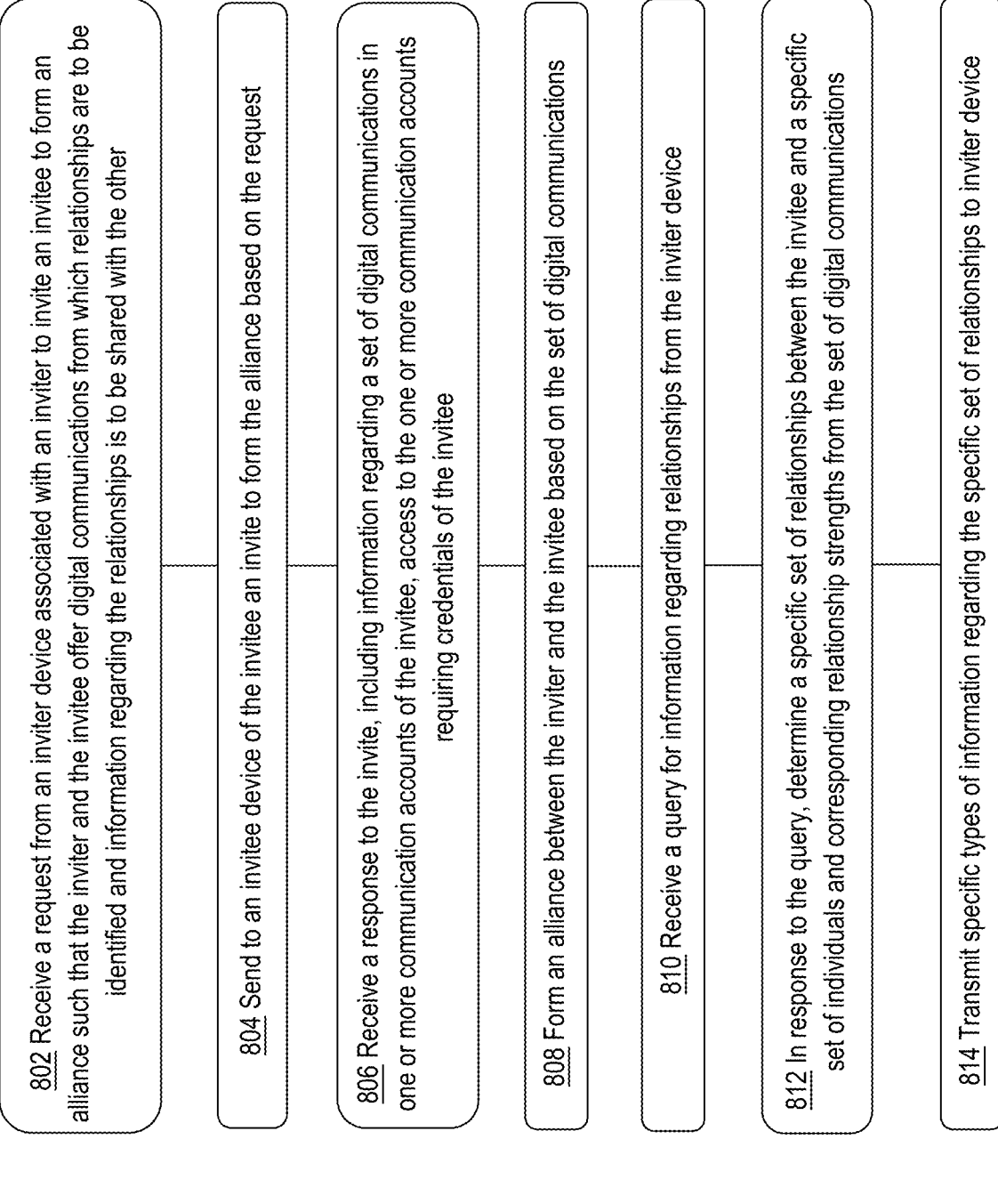

FIG. 8

802 Receive a request from an inviter device associated with an inviter to invite an invitee to form an alliance such that the inviter and the invitee offer digital communications from which relationships are to be identified and information regarding the relationships is to be shared with the other 804 Send to an invitee device of the invitee an invite to form the alliance based on the request 806 Receive a response to the invite, including information regarding a set of digital communications in one or more communication accounts of the invitee, access to the one or more communication accounts requiring credentials of the invitee 808 Form an alliance between the inviter and the invitee based on the set of digital communications 810 Receive a query for information regarding relationships from the inviter device 812 In response to the query, determine a specific set of relationships between the invitee and a specific set of individuals and corresponding relationship strengths from the set of digital communications 814 Transmit specific types of information regarding the specific set of relationships to inviter device

Figure 14:
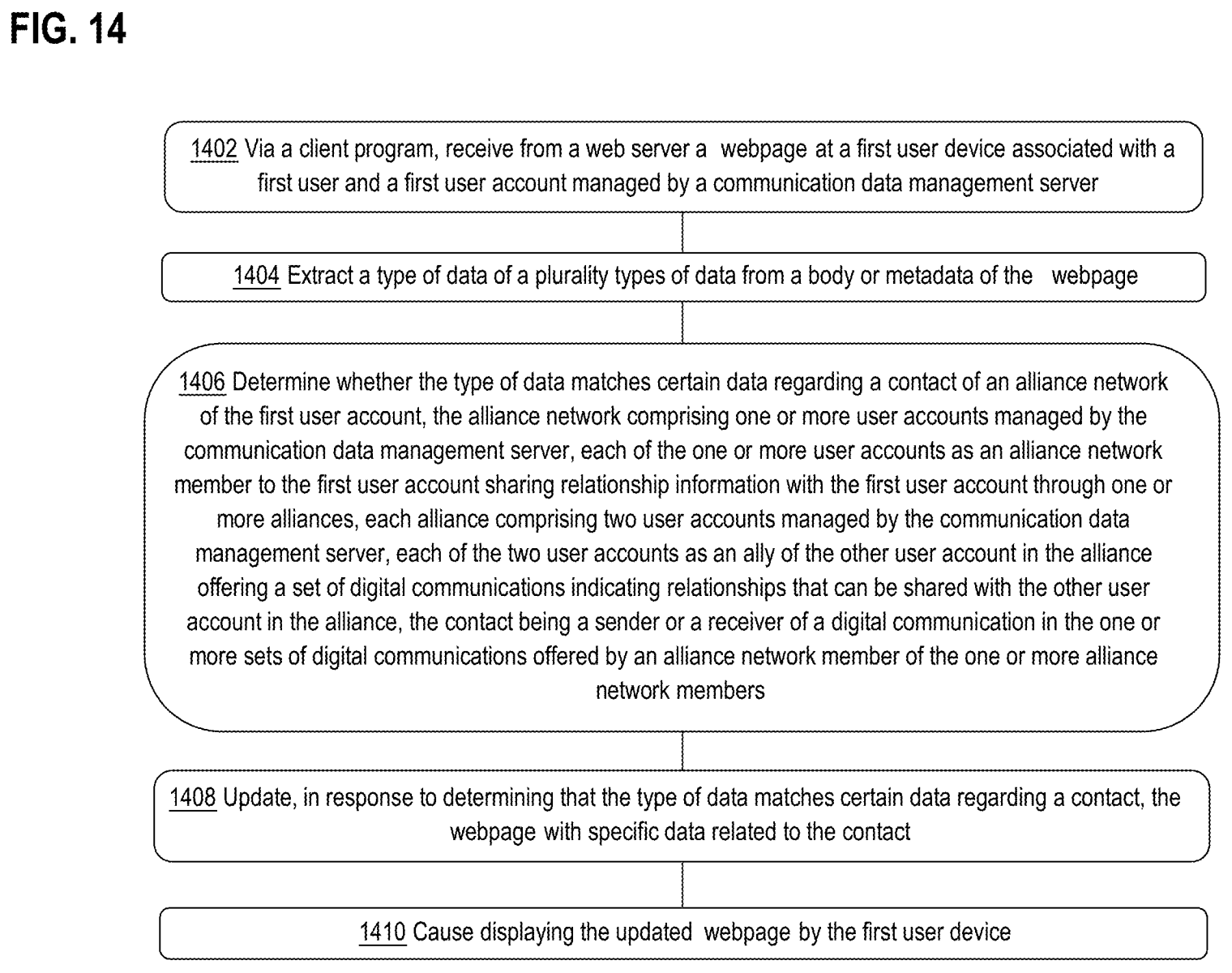

1402 Via a client program, receive from a web server a webpage at a first user device associated with a first user and a first user account managed by a communication data management server 1404 Extract a type of data of a plurality types of data from a body or metadata of the webpage 1406 Determine whether the type of data matches certain data regarding a contact of an alliance network of the first user account, the alliance network comprising one or more user accounts managed by the communication data management server, each of the one or more user accounts as an alliance network member to the first user account sharing relationship information with the first user account through one or more alliances, each alliance comprising two user accounts managed by the communication data management server, each of the two user accounts as an ally of the other user account in the alliance offering a set of digital communications indicating relationships that can be shared with the other user account in the alliance, the contact being a sender or a receiver of a digital communication in the one or more sets of digital communications offered by an alliance network member of the one or more alliance network members 1408 Update, in response to determining that the type of data matches certain data regarding a contact, the webpage with specific data related to the contact 1410 Cause displaying the updated webpage by the first user device

ENHANCING ONLINE CONTENTS BASED ON DIGITAL ALLIANCE DATA

BENEFIT CLAIM

This application claims the benefit under 35 U.S.C. § 120 as a Continuation of U.S. patent application Ser. No. 18/478,863, filed on Sep. 29, 2023, which is a Continuation of U.S. patent application Ser. No. 18/091,271, filed on Dec. 29, 2022, now U.S. Pat. No. 11,799,819, issued on Oct. 4, 2023, which is a Continuation of U.S. patent application Ser. No. 17/472,584, filed on Sep. 11, 2021, now U.S. Pat. No. 11,552,922, issued on Jan. 10, 2023, which is a Continuation of U.S. patent application Ser. No. 16/228,107, filed on Dec. 20, 2018, now U.S. Pat. No. 11,153,255, issued on Oct. 19, 2021, the entire contents of which are hereby incorporated by reference as if fully set forth herein. Applicant hereby rescinds any disclaimer of claim scope in the parent applications or the prosecution history thereof and advises the USPTO that the claims in this application may be broader than any claim in the parent applications.

FIELD OF THE DISCLOSURE

One technical field of the present disclosure is digital communication processing. Another technical field is computer-implemented analysis of digital communications including automatic filtering, transformation, and display of messages and electronic documents.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The Internet has made it easy to connect with others electronically but also challenging to manage such connections. Existing social network systems and professional network systems typically create and store digital records of friends or connections based upon a binary sense of linkage: a first user account is either a friend or connection of a second user account, or not. There are limited ways to account for the type of relationship and limited ways to filter the display of messages, electronic documents or other content based upon the type or strength of relationship. Furthermore, computer-implemented tools for supporting decisions based on type or strength of relationship are either too complex, being directed to intelligence analysis and the like, or inappropriate for business communication management. It would be helpful to have computer support to identify whom to contact for specific purposes and how to establish such a contact more efficiently and effectively.

BRIEF DESCRIPTION OF THE DRAWINGS

In the drawings:

FIG. 2 illustrates example components of a communication management server computer in accordance with the disclosed embodiments.

FIG. 8 illustrates an example process performed by the communication management server computer of managing alliances and associated relationship data.

FIG. 9B illustrates the example webpage provided by the mail server with subsequent enhancement made by the user device receiving the webpage.

FIG. 10D illustrates the example webpage provided by the organizational server with subsequent enhancement made by the user device receiving the webpage.

FIG. 14 illustrates an example process performed by a user device via a client program of the communication management server computer of enhancing online contents based on digital alliance data.

DETAILED DESCRIPTION

Figure 1:
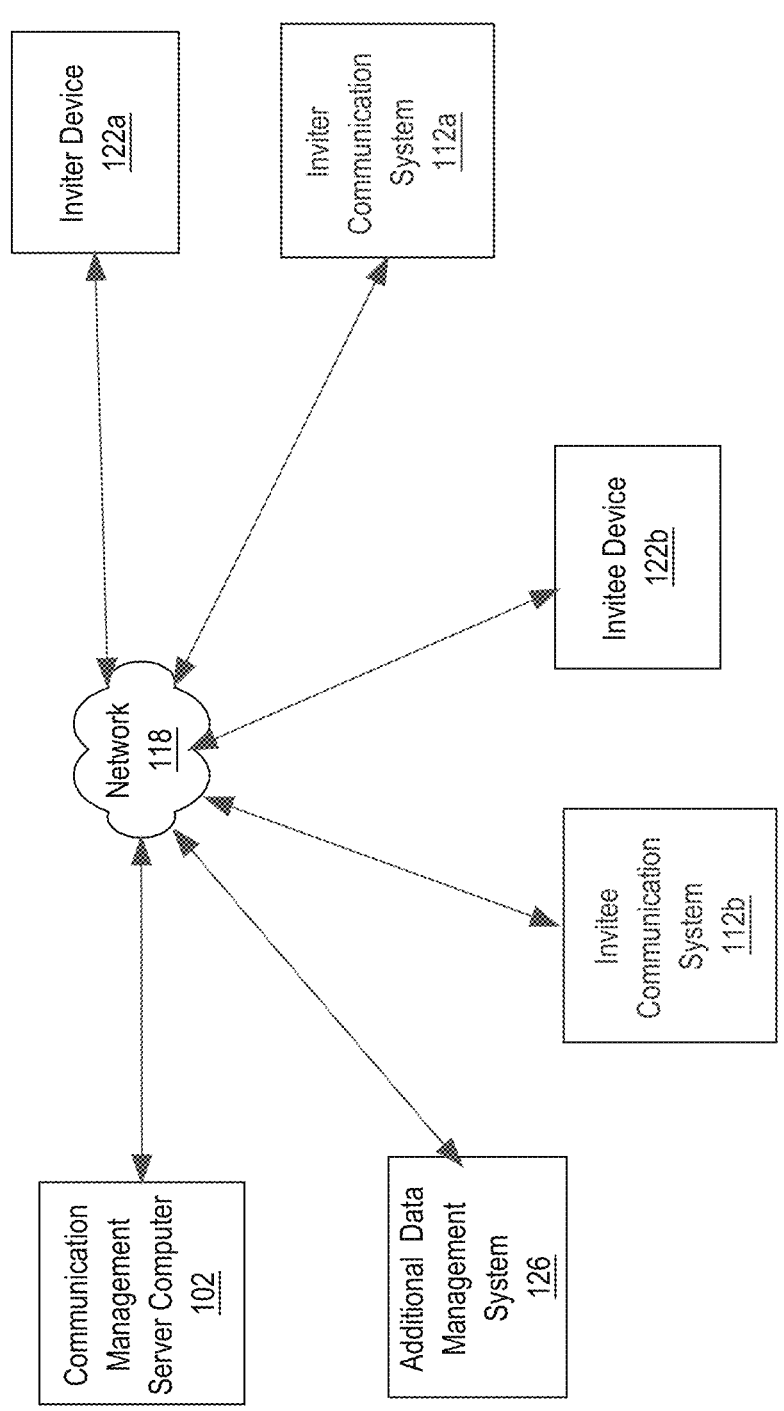
FIG. 1 illustrates an example networked computer system in which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline:

1. GENERAL OVERVIEW
2. EXAMPLE COMPUTING ENVIRONMENT
3. EXAMPLE COMPUTER COMPONENTS
4. FUNCTIONAL DESCRIPTION
    4.1. DEVELOPING ALLIANCES
    4.2. UTILIZING ALLIANCES
    4.3. ENHANCING ONLINE CONTENTS BASED ON DIGITAL ALLIANCE DATA
5. EXAMPLE PROCESSES
6. HARDWARE IMPLEMENTATION

1. GENERAL OVERVIEW

A communication management server computer ("server") and related methods are disclosed to create and store digital records representing alliances between user accounts and to use the alliance records in filtering messages or other content and/or determining attributes of messages or content for display. The server allows two electronic devices associated with two user accounts to establish an alliance, where each of the two user accounts offers a set of digital communications for exploration of relationships and agrees to share certain types of information regarding the relationships with the other user account. Each user account can be associated with one or more electronic devices. The user account and each associated electronic device may be referenced interchangeably hereinafter. Two user accounts in an alliance are allies of each other and share relationship information with each other through the alliance. A second account sharing relationship information with the first account through one or more alliances is denoted and processed as a member of the alliance network of the first account. An individual that is not a user but is involved in a digital communication offered by a user account for use in the alliance network is denoted and processed as a contact of the alliance network.

For example, user accounts associated with individuals A and B are established in digital records in the system; A works for a marketing company and B works for a customer services company. A knows B and communicates with B through email. Now A hopes to expand A's network via B's connections. A is represented by A's electronic device or user account, and B is represented by B's electronic device or user account. In some embodiments, A's electronic device can be programmed to transmit a request to the server to invite B's electronic device to form an alliance. The request indicates what A offers in forming the alliance, specifically a set of digital communications between A and other individuals. For example, A might offer the messages within the email account A uses to communicate with B, where the parties ("contacts") involved in those messages, such as senders or receivers of those messages, include C and D. The request can also indicate what A is willing to share with B. For example, A might decide to share with B only the name, an email address, and a relationship strength associated with each of A's contacts revealed by A's email messages. In addition, the request can indicate what A requests B to offer in forming the alliance, such as the messages within the email account B uses to communicate with A. The request can also indicate what A would like B to share with A, such as the name, an email address, and a relationship strength that is associated with each of B's contacts revealed by B's email messages. The server is programmed or configured to transmit, in response, an invitation based on the request to form an alliance to B's electronic device. B can accept or reject the invitation. To accept the invitation, B's electronic device can be programmed to transmit a response to the server. The server is programmed to create and store digital records representing an alliance between A's device and B's device and by association between A and B, who become allies of each other. Allies can be in symmetric positions exploring each other's relationships in similar manners regardless which ally was the inviter or which ally was the invitee. Thus, at least after an alliance is formed, any operation performed by an inviter device can be performed by an invitee device, and vice versa.

In other embodiments, A's request may not indicate what A expects from B, and B's response can indicate what B would offer or be willing to share with A upon forming an alliance. A's electronic device and B's electronic device can continue to negotiate through the server until an agreement is made.

In some embodiments, upon forming an alliance, the server is programmed or configured to determine A's relationships with A's contacts from the set of digital communications offered by A and determine B's relationships with B's contacts from the set of digital communications offered by B. The determination may be based upon metadata representing past computer-based interactions or digital communications between the user accounts. For example, the analysis of B's email messages might reveal E to be one of B's main contacts. The server can be programmed to further determine, based on B's email messages or external data sources, that E works as a manager for a technology company. Subsequently, A might need to find prospects who are managers at technology companies. A's electronic device can submit a query for information regarding such prospects to the server. According to the alliance, the server is then programmed to return the types of information regarding E that is sharable with A, such as the name, an email address, and a relationship strength associated with E, in response to the query. In addition, the server can be configured to facilitate an introduction of A by B to E, thereby expanding A's network via B's connections.

In some embodiments, the server is programmed or configured to cause transmission of a client program to a user device. The client program comprises computer-executable instructions for enhancing online contents, such as webpages, based on digital alliance data. For example, the client program can be a browser add-on or another form of extension. The user device via the client program is configured to receive online contents, such as a webpage. The user device is configured to determine how to enhance the online contents based on the digital alliance data and cause the display of the enhancement. Such enhancement generally assists a user or user account of the user device in establishing new relationships through the alliance network of the user account.

In some embodiments, the user device via the client program is configured to look for certain data in the online contents that may identify a contact of the user account or an organization which employs such a contact. For example, the online contents may be the user profile managed by LinkedIn of an individual named David with whom the user named Wendy of the user account would like to connect. The user device is configured to thus extract the name of the individual from the user profile, confirm that the individual is a contact of the alliance network of the user account, collect information regarding at least one communication path for the user to connect with the contact, and updates the user profile with such information. The confirmation and collection may need to be coordinated with the server. In this example, the collected information may include an identifier of the user named Teddy of an alliance network member who has offered digital communications for exploration of relationships involving David and an indicator of how strong or successful a connection of Wendy with David through Teddy will be. The updates to the user profile can be displayed together with or subsequent to the initial display of the user profile. In this example, the identifier and indicator can be displayed soon after David's user profile is fully loaded and in a sidebar that does not interfere with the David's user profile. Therefore, in response to a request for David's user profile, information regarding how to connect with David through a member of the alliance network of Wendy's account is automatically presented to Wendy in a way that is easy to view and understand.

The communication management server computer offers many technical benefits. By using alliance data records as a basis of filtering messages that are transmitted between user accounts, for example, the server reduces the number of digital transmissions among electronic devices and thus reduces network traffic at multiple levels. Initially, fewer alliances are formed than simple links or connections, as formation of an alliance requires offering certain digital communications for relationship exploration, discovery, and development, when those digital messages are otherwise maintained in private communication accounts. Therefore, the volume of invitations and responses associated with alliances is smaller than those associated with simple links or connections. Furthermore, fewer substantive communications are made to reach the contacts of allies because the digital communications offered by the allies enable careful evaluation of significance scores of matching interests and relationship strengths and direction of communication efforts to new relationships that are more likely to be created and remain relevant. The server's ability to focus on such new relationships also increases the quality of digital communications and saves users' time. By tapping into available resources, namely automatically analyzing users' past digital communications, the server allows a user to quickly expand the user's network and accomplish project goals while bolstering existing relationships without much extra work.

2. EXAMPLE COMPUTING ENVIRONMENT

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, the networked computer system comprises a communication management server computer 102 ("server"), one or more inviter devices 122a, one or more inviter communication systems 112a, one or more invitee devices 122b, one or more invitee communication systems 112b, and one or more additional data management systems 126, which are communicatively coupled directly or indirectly via one or more networks 118.

In some embodiments, the server 102 broadly represents one or more computers, virtual computing instances, and/or instances of a server-based application that is programmed or configured with data structures and/or database records that are arranged to host or execute functions including but not limited to managing alliances each formed by two electronic devices respectively associated with two user accounts and digital communications of the two user accounts associated with the alliance. "Alliance" in this context refers to digital data stored in records in a database or other data repository that indicate or represent a relationship between a first user account and a second user account, where the existence of such a relationship drives execution of data filtering and transmission operations according to constraints, as further described herein. The server 102 can comprise a server farm, a cloud computing platform, a parallel computer, or any other computing facility with sufficient computing power in data processing, data storage, and network communication for the above-described functions.

In some embodiments, an inviter device 122a associated with an inviter is programmed to extend an invitation to an invitee device 122b associated with an invitee to form an alliance and, after an alliance is formed, explore relationships of the invitee based on certain digital communications of the invitee originally managed by the invitee communication system 112b. The inviter device 122a may comprise a desktop computer, laptop computer, tablet computer, smartphone, wearable device, or any other type of computing device with sufficient computing power in data processing, data storage, and network communication.

In some embodiments, the inviter communication system 112a is programmed to manage one or more communication accounts of the inviter holding digital communications of the inviter, such as email messages, calendar entries, phone call histories, or chat messages. Typically, such a communication account is associated with certain credentials that are required for access to the communication account and the digital communications therein. In certain embodiments, the inviter communication system 112a may be integrated with the inviter device 122a.

In some embodiments, an invitee device 122b is programmed to receive the invitation from the inviter device 112a, accept or reject the invitation, and, after the alliance is formed, explore relationships of the inviter based on certain digital communications of the inviter originally managed by the inviter communication system 112a. The invitee device 122b is otherwise similar to the inviter device 122a.

In some embodiments, the invitee communication system 112b is programmed to manage one or more communication accounts of the invitee holding digital communications of the invitee, such as email messages, calendar entries, phone call histories, or chat messages. Typically, such a communication account is associated with certain credentials that are required for access of the account and the digital communications therein. In certain embodiments, the invitee communication system 112b may be integrated with the invitee device 122b.

In some embodiments, the data management system 126 is programmed to manage one or more data sources, such as data regarding people, corporations, or other types of entities.

The networks 118 may be implemented by any medium or mechanism that provides for the exchange of data between the various elements of FIG. 1. Examples of network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, the inviter device 122a is configured to send a request to the server 102 for inviting the invitee device 122b to form an alliance. The request contains information necessary to access a communication account of the inviter managed by the inviter communication system 112a, the portion of the digital communications from which relationships of the inviter can be identified for the invitee, and the types of information regarding these relationships that can be shared with the invitee. The server 102 is programmed to send an invitation based on the request to the invitee device 122b. The invitee device 122b is configured to reject or accept the invitation. To accept the invitation, the invitee device 122b is configured to send a response to the server 102. The response similarly contains information necessary to access a communication account of the invitee managed by the invitee communication system 112b, the portion of the digital communications from which relationships of the invitee can be identified for the inviter, and the types of information regarding these relationships that can be shared with the inviter.

In some embodiments, the server 102 is programmed to establish an alliance between the inviter device 122a and the invitee device 122b based on the request from the inviter device 122a and the response from the invitee device 122b. The server 102 is programmed to further access the communication accounts of the inviter and the invitee to retrieve digital communications of the inviter and invitee and identify relationships from the portions of the digital communications of the inviter and the invitee according to the alliance. In addition, the server 102 is programmed to access the data sources managed by the data management system 126 to retrieve data regarding different types of entities that may be involved in the relationships.

In some embodiments, the inviter device 122a (or the invitee device 122b) is configured to send a query for information related to certain prospects. The server 102 is programmed to respond to the query by searching the data regarding the relationships identified from the portion of the communications of the invitee (or the inviter) according to the alliance and additional data regarding the entities involved in the relationships and return the search result to the inviter device 122a (or the invitee device 122b). The search can be extended to data regarding the relationships identified from appropriate portions of the communications of the user accounts in the alliance network of the invitee (or the inviter) account, as further discussed below.

3. EXAMPLE COMPUTER COMPONENTS

FIG. 2 illustrates example components of the communication management server computer in accordance with the disclosed embodiments. This figure is for illustration purposes only and the server 102 can comprise fewer or more functional or storage components. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the server 102 can comprise alliance formation instructions 202, communication data management instructions 204, relationship data management instructions 206, search instructions 212, entity data management instructions 216, and online contents management instructions 218. In addition, the server 102 can comprise a database module 220.

In some embodiments, the alliance formation instructions 202 enable managing the formation of an alliance between an inviter device 122a and an invitee device 122b, such as communicating with such devices in forming the alliance.

In some embodiments, the communication data management instructions 204 enable managing digital communications of the inviter and the invitee. Such management may include communicating with the inviter communication system 112a and the invitee communication system 112b to retrieve digital communications of the inviter and the invitee and managing copies or views of these digital communications in local databases.

In some embodiments, the relationship data management instructions 206 enable managing relationship data derived from the digital communications of the inviter and invitee or more broadly the digital communications offered by each user account for exploration of relationships. Such management may include identifying relationships from the digital communications and controlling which types of information regarding the relationships are made accessible to a specific user device.

In some embodiments, the search instructions 212 enable managing the search process in response to a query directly submitted by a user device or based on relevant data extracting from online contents received by a user device. Such management may include communicating with the user device and searching the relationship data in local databases for matches to the query. Such management may further include collecting information regarding at least one communication path that connects the user to the new contact through an alliance network member of the user's account and communicating with a device of the user or a device of the alliance network member.

In some embodiments, the entity data management instructions 216 enable managing data regarding different types of entities, such as a person or an individual, a company or a corporate entity, or an organization of any purpose, or other data relevant for relationship exploration and formation. Such management may include communicating with the data management system 126 and supplementing the relationship data with entity data or other data retrieved from external data sources.

In some embodiments, the online contents management instructions 218 enable managing online contents, such as webpages and URLs, received by a user device associated with a user account. Such management may include extracting relevant data from the online contents, identifying enhancements to the online contents, and causing displaying of the enhancements. Such management may also include packaging such features into a client program, transmitting the client program to the user device, and communicating with the user device via the client program.

In some embodiments, the database 220 is programmed or configured to manage relevant data structures and store relevant data for functions performed by the server 102. The data may correspond to alliances, persons or individuals, companies or other corporate entities, other organizations, relationships, websites, webpages, other online data, communication accounts, or digital communications. For an organization, which can correspond to a corporate entity, a department within a corporate entity, a high school class, a choir, or a wine club, values of various attributes may also be stored, such as name, location, size, or industry. For an individual, values of various attributes may be stored, such as name, communication mechanisms, credentials for communication accounts, names of organizations to which the individual belongs, or names of employers.

4. FUNCTIONAL DESCRIPTION

4.1. Developing Alliances

In some embodiments, the server 102 is programmed or configured with data structures and/or database records that are arranged to receive a request for forming an alliance from an inviter device 122*a* associated with an inviter. The inviter could be an administrator of the server 102 or a regular user. The request identifies the inviter or the inviter device. The request also identifies an invitee, which can include a name or the ID of a communication account, such as an email address, a phone number, or a chat program user ID.

In some embodiments, the request can include information regarding access to one or more of the inviter's communication accounts, such as an account for email, event scheduling, or chat. The request can indicate a selection criterion to be applied to the digital communications in the one or more communication accounts, indicating a set of the inviter's digital communications to be associated with the alliance. The selection criterion can refer to any field of a digital communication. For example, the selection criterion can be all the email messages in the folder named "Construction Project", all the email messages of which a specific user did not receive a copy, or all the calendar entries for events that took place during March. The request can also provide a specification of the types of information regarding relationships identified from the set of the inviter's digital communications that are to be shared with the invitee device 122*b*. Default types of information can include names of individuals or contacts in the relationships and the corresponding relationship strengths. Additional types of information can include, for each of those contacts, a summary of digital communications with the contact in terms of communication mechanism, frequency, nature, etc. The credentials for the one or more communication accounts, the selection criterion, or the specification of the types of information regarding the relationships to be shared can also be transmitted to the server 102 after a response is received from the invitee device 122*b*.

Moreover, the request can provide information regarding expanding the alliance. For example, default relationship sharing can be that only two parties that form an alliance can explore the other's relationships based on the digital communications offered by the other for relationship exploration and discovery. The default can then be expanded via a transitive relationship. For further example, A and B forms an alliance, so that information regarding A's relationships based on A's email is shared with B and information regarding B's relationships based on B's calendar entries is shared with A. Subsequently, A and C forms a separate alliance, where information regarding A's relationships based on A's chats is shared with C and information regarding C's relationships based on C's email is shared with A. The default can be that nothing is shared between B and C before they form their own alliance. The default can then be expanded by one degree of alliance, so that through A, information regarding B's relationships based on B's calendar entries is shared with C and information regarding C's relationships based on C's email is shared with B. B or A can also specify that while information regarding B's relationships based on all of B's calendar entries is shared with A, only information regarding B's relationships based on some of B's calendar entries is shared with an individual who is not B's ally. The individuals that share relationship information through one or more alliances or their user accounts are then in an alliance network. In the example above, B could be the inviter, and A could be the invitee. When a maximum degree for B's alliance network is two (one or more than default), C is allowed to share B's relationship information through A. Thus, request from the inviter device 122*a* can also indicate a maximum degree (with one being the default) for the inviter's alliance network or a selection criterion for each additional degree. This request can also be transmitted to the invitee device 122*b* after a response is received from the invitee device 122*b*.

Furthermore, the request can include additional privacy settings or constraints applicable to the alliance to be formed. Similar privacy settings or constraints can also be specified at the user account level applicable to all alliances formed by the inviter or associated user account. Such privacy constraints can limit the use of the alliance to be formed to varying degrees. For example, a privacy constraint can allow exploration of relationships within the inviter's communication accounts associated with this alliance only by the invitee account and other user accounts associated with specific industries or certain business positions. For further example, another privacy constraint can hide the identity of the inviter when one of the relationships that can be derived from the inviter's communication accounts is included in a search result for a search query made by a user account in the alliance network of the inviter account other than the invitee account. Another privacy constraint can specify which relationships with contacts are explorable by user accounts in the alliance network in terms of various attributes of a contact, such as an ID, name, or domain of the contact's email address.

In some embodiments, upon receiving the request, the server 102 is programmed to look up the inviter in the database 220, including identifying an organization to which the inviter belongs, as further discussed below. The server 102 can be programmed to also look up the invitee in the database 220 and when data regarding the invitee is found, identify an organization to which the invitee belongs. Then, the server 102 is programmed to prepare an invitation based on the request and have the invitation transmitted to an invitee device 122*b*. The invitation includes information regarding the inviter, such as the name, the organization identified for the inviter, or an email address. The invitation also indicates an intention to form an alliance with the invitee by offering each other's digital communications for relationship exploration and discovery. In addition, the invitation can include a summary of the digital communications offered by the inviter for relationships exploration and discovery. For example, the summary can be a description of the selection criterion provided by the inviter device 122*a*. The invitation can also include one or more other types of information included in the request.

Furthermore, the invitation includes a request to provide access to one or more of the invitee's communication accounts. The invitation can further include a request to provide a selection criterion to be applied to the digital communications in the one or more communication accounts, indicating the set of the invitee's digital communications to be associated with the alliance. In addition, the invitation can include a request to provide a specification of the types of information regarding relationships identified from the set of the invitee's digital communications that are to be shared with the inviter device 122a. The invitation can also include a request for the invitee to join the organization identified for the inviter. Furthermore, the invitation can include a request to indicate a maximum degree for the invitee's alliance network or a selection criterion for each additional degree. One or more of the requests discussed in this paragraph can also be transmitted to the invitee device 122b after a response is received from the invitee device 122b.

In some embodiments, the server 102 is programmed to receive a response to the invitation from the invitee device 122b. The response can include a rejection of the invitation, in which case the server 102 is configured to send a notification of the rejection to the inviter device 122a. Alternatively, the response can include an acceptance of the invitation. In that case, the server 102 is configured to send a notification of the acceptance to the inviter device 122a. The response can also include information that allows the server 102 to access one or more of the invitee's communication accounts. The response can also include a selection criterion to be applied to the digital communications in the one or more communication accounts. In addition, the response can include a specification of types of information regarding relationships identified from the set of the invitee's digital communications that are to be shared with the inviter device 122a. In addition, the response can include an indication of whether to join the organization identified for the inviter, to remain in the organization identified for the invitee, or to form a new organization corresponding to the alliance. Moreover, the response can include a maximum degree for the invitee's alliance network or a selection criterion for each addition degree. Similar to a request, the response can include other types of information, such as privacy settings or constraints specific to the alliance being formed. It is to be understood that the formation of an alliance can be an iterative process, with parts of the requests or response provided to the server 102 in an incremental manner in a negotiation between the inviter device 122a and the invitee device 122b until an agreement is reached. In addition, default values can be used so that not all parts of the request and response discussed above need to be communicated to the server 102.

In some embodiments, upon receiving the response, when the invitee is a new user, the server 102 is programmed to request additional information regarding the invitee and the invitee device 122b, such as a business entity the invitee works for, different contact mechanisms to reach the invitee, and so on. Overall, the server 102 is configured to store all the data received from the inviter device 122a and the invitee device 122b to the database 220, which constitute at least part of digital alliance data representing the alliance between the inviter and the invitee. The server 102 can also be programmed to transmit certain data in the response that did not correspond to any part of the request to the inviter device 122a.

In some embodiments, the server 102 is programmed to receive a request for forming an alliance from an inviter device 122a or any other user device that does not identify an invitee. The server 102 can be programmed to post an invitation corresponding to the request at an address accessible to one or more user devices, such that a selection of the address or a view of the posting by an invitee device 122b or any other user device generates an acceptance of the invitation or at least triggers a process to respond to the invitation, as described above. The server 102 can be programed to also broadcast the address to select user devices, or without any posting, directly broadcast the invitation to select user devices. Alternatively, the server 102 can be configured to rely on the sender of the request to communicate the address to other user devices. For example, the address can be in the form of a URL, and the address can be announced by the inviter device 122a to every email address in an address book associated with the inviter device 122a.

In some embodiments, the server 102 is programmed to receive a request to become a user from a user device, which is then able to extend invites to another user device to form an alliance. The request can also be submitted on behalf of another user device associated with another user. For example, a request can be to sign up all the user devices associated with all the employees of an employer, offering all the employees' email accounts for forming alliances. In response, the server 102 can be configured to assign all those user devices and the associated user accounts to the same organization, which may correspond to the employer's corporate entity. The server 102 can be programmed to further form an alliance between every pair of those user devices, so that each employee has access to the relationships revealed by every other employee's email.

In some embodiments, the server 102 is programmed to access the one or more of the inviter's communication accounts and download the communications into the database 220 as soon as the credentials for the one or more communication accounts are received, according a specific schedule, or in response to a relevant search, such as a search by the invitee. The download can be incremental to a previous download. The server 102 is further programmed to apply each selection criterion provided by the invitee for the alliance to the digital communications in the one or more communication accounts to obtain a set of the inviter's digital communications specific to the inviter or another individual in the invitee's alliance network according to a specific schedule or in response to a relevant search.

In some embodiments, the server 102 is configured to further identify a list of contacts from the set of the inviter's digital communications and corresponding relationship strengths. For example, when the set of the inviter's digital communications is a number of email messages, the senders or recipients of each email message other than the inviter can be identified, and the number of times each of these individuals is a sender or a receiver can be used to compute the corresponding relationship strength. The inviter's digital communications can be augmented with additional data from external data sources in determining the relationship strengths. Examples of the additional data include communication information related to public conferences, events, or social networks. The server 102 is programmed to establish person data for each of the contacts based on the set of digital communications or external data sources. For example, the employer of a contact may be derived from the email address of the contact or specific remarks of the contact in the set of digital communications. Such employment information can also be retrieved from the employer's website or other public data sources. The contact can also be assigned to one of the organizations in a similar manner. Depending on the types of information regarding relationships identified from the set of the inviter's digital communications that are to be shared with the invitee or another individual in the inviter's alliance network, the server 102 can be configured to determine additional types of information concerning the relationships. For example, for each identified contact, the server 102 can be configured to compute the number of digital communications via a specific communication mechanism or within a specific period of time; the server 102 can also be configured to compile a list of headers of these digital communications or a summary of all these digital communications. The server 102 is programmed to further repeat this process with the invitee's digital communications based on the invitee's acceptance.

In some embodiments, the server 102 is programmed to obtain or compute a strength of an alliance between two user accounts, which may depend on the number or types of digital communications offered for exploration by the two user accounts, the number of other user accounts who are common allies of two two user accounts, or the number and types of interests of the two user accounts. For example, the alliance strength may be higher when the digital communications came from a private communication account as opposed to a business communication account or were transmitted during the last month as opposed to last year.

4.2. Utilizing Alliances

In some embodiments, the server 102 is programmed to receive a query from a first user device associated with the first user for relationship information associated with a second user who is an ally of the first user. In response, the server 102 is programmed to determine the list of relationships of the second user and specific types of information regarding those relationships according to the alliance with between the first user and the second user. The identification can be performed by real-time computation or based on data already stored in the database 220. For example, when the second user has agreed to share with the first user email and relationship strength information regarding his relationships based on a selection of his calendar entries, the server 102 can be configured to access the second user's calendar entries, obtain the selection of calendar entries, identify the list of contacts from the selection, and retrieve or compute the corresponding list of relationship strengths for those contacts. Alternatively, the selection of calendar entries, the list of contacts, or the list of relationship strengths may already be in the database 220 and simply need to be retrieved. Similarly, the query may be for relationship information associated with a third user who is in the first user's alliance network. The server 102 is programmed to further return the specific types of information regarding a list of relationships of the third user visible to the first user to the first user device.

In some embodiments, the server 102 is programmed to receive a query from a first user device associated with the first user for relationship information associated with allies of the first user concerning a contact. In response, the server 102 is programmed to determine the list of relationships of the allies of the first user with the contact and specific types of information regarding those relationships according to the alliance between the first user and each of the allies. Similarly, the query may be for relationship information associated with members of the alliance network of the first user concerning the contact. The server 102 is programmed to further return the specific types of information regarding a list of relationships of the members to the first user to the first user device.

Figure 3:
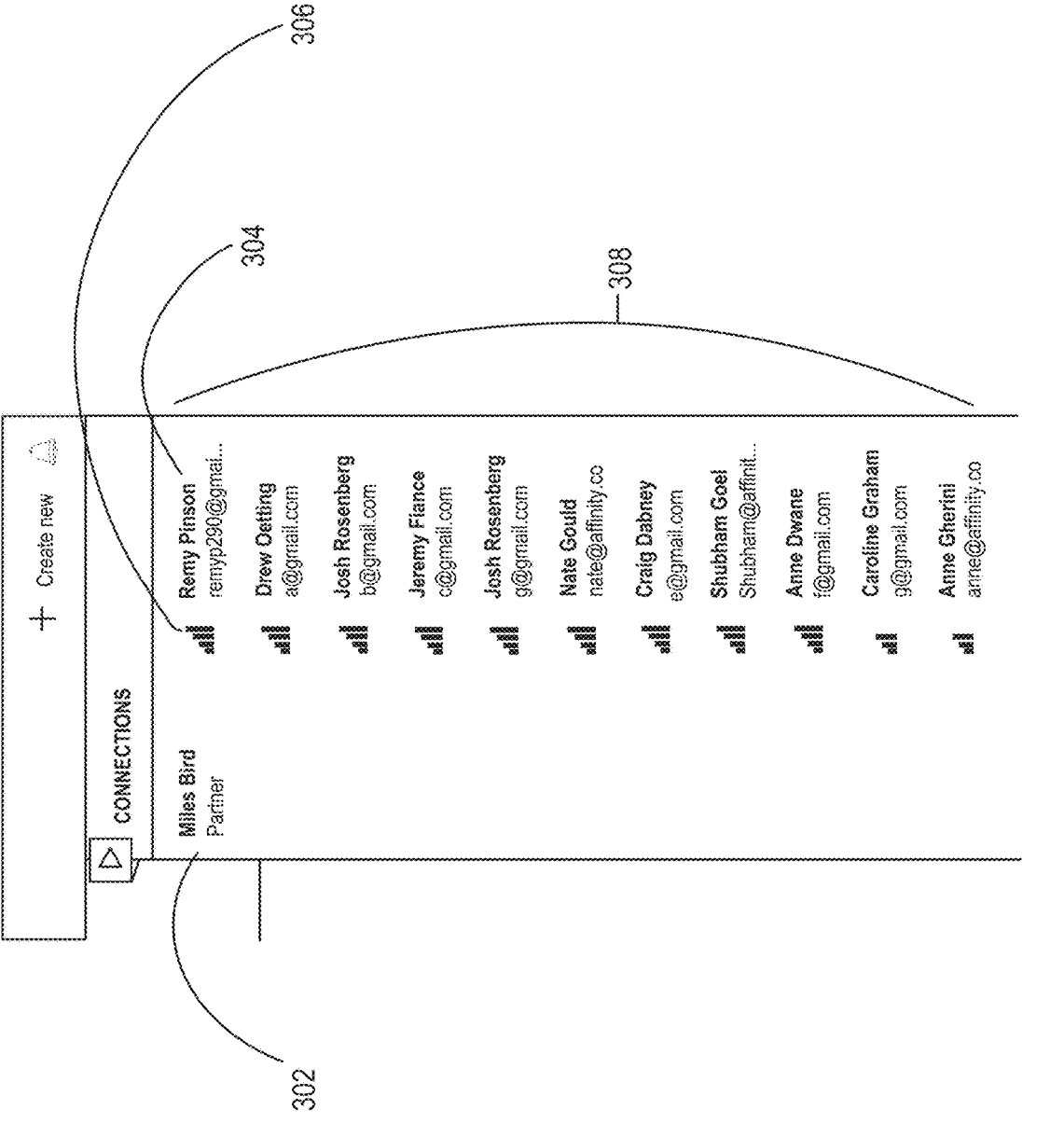
FIG. 3 illustrates an example screen of a graphical user interface that shows information regarding a list of relationships visible to a first user between each of a list of allies of the first user's account and a contact.

FIG. 3 illustrates an example screen of a graphical user interface that shows information regarding a list of relationships visible to a first user between each of a list of allies of the first user's account and a contact. In this example, identifying information 302 regarding the contact is displayed. A list of entries 308 corresponding to the list of relationships each including identifying information regarding an ally of the first user and the corresponding relationship strength is also displayed. Specifically, the first entry of the list includes the name and email address 304 of an ally and a relationship strength indicator 306 in the form of colored or shaded one through five bars, with more bars indicating a stronger relationship. The relationship strength indicator as shown here is for illustration only and it can have other shapes or forms. For example, it can use numerical values to indicate different relationship strengths.

The query can be expanded to be for relationship information associated with a member of the alliance network of the first user's account concerning the contact. The screen can then include additional information for each of the list of determined relationships, such as the degree or the number of alliances required from the first user to reach the contact. Each entry can also indicate information regarding at least one of these alliances. For example, when the first user's account and a second user's account are in an alliance, the second user's account and the ally with the name and email address 304 are in an alliance, a degree of two and identifying information regarding the second user can also be included in the first entry.

The query can be expanded to be for relationship information associated with a second user in the alliance network of the first user's account. The screen can then include additional information for each of the list of determined relationships, such as the degree or the number of alliances required from the first user to reach an individual involved in the relationship. Each entry can also indicate information regarding the individuals or their associated accounts forming these alliances. For example, when the second user's account and a third user's account are in an alliance and it is the third user that is related to the contact identified by the information 302, a degree of two and identifying information regarding the third user can be included in the first entry.

Figure 4:
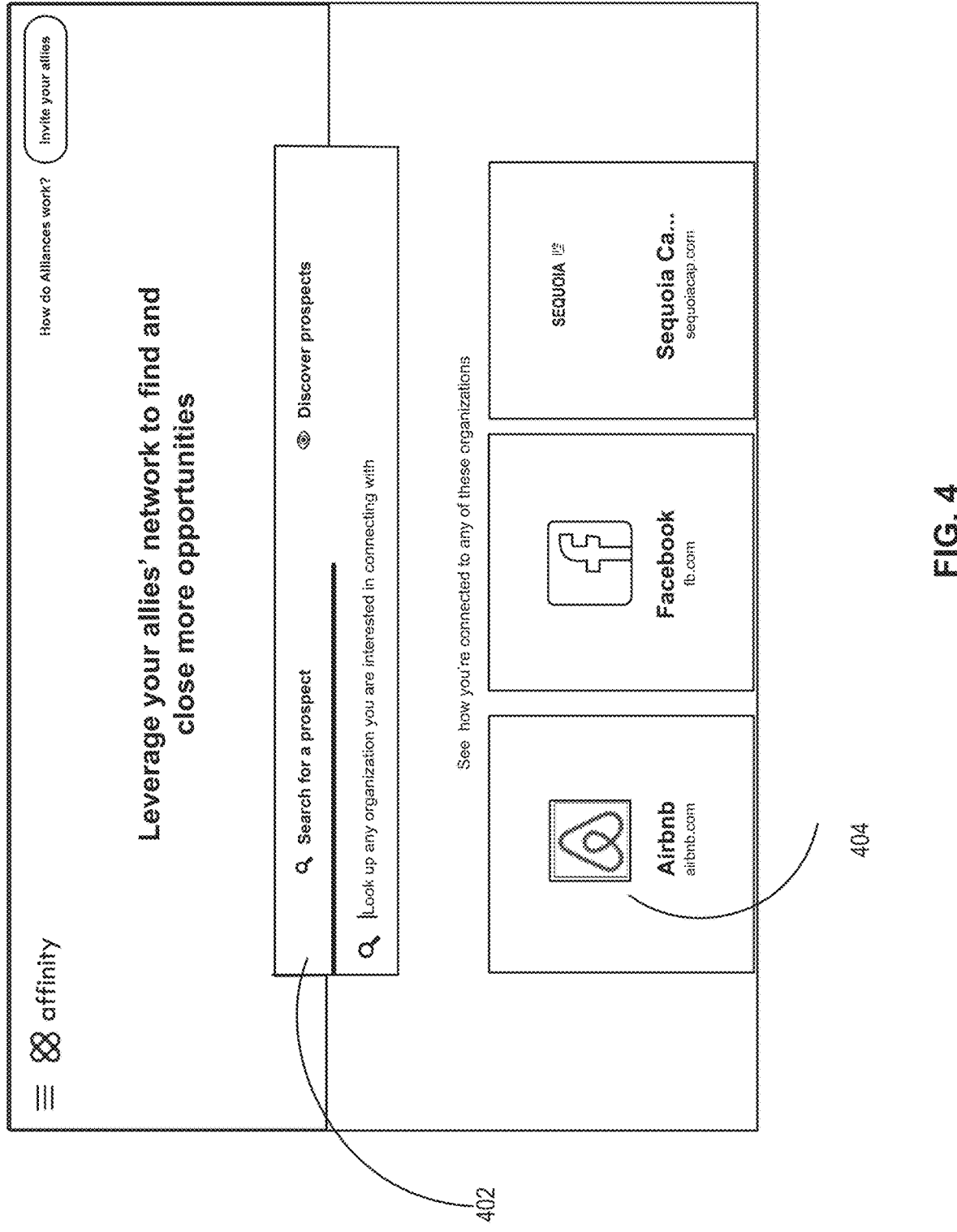
FIG. 4 illustrates an example screen that allows querying for information regarding relationships associated within an organization.

In some embodiments, the server 102 is programmed to receive a query for information regarding relationships within an organization from a first user device associated with a first user. FIG. 4 illustrates an example screen that allows querying for information regarding relationships within an organization. The screen includes a text field 402 for entering a text query, such as the name, address, or other identifying information or attributes of an organization. The screen also includes an icon 404 representing each of specific organizations, the selection of the icon leading to a query corresponding to the corresponding organization. These specific organization can be the most often searched by the first user device or by a specific group of user devices within a specific period of time. These specific organization can also be the most relevant to the first user device or the first user, such as prospective customers or employers for the first user.

In some embodiments, in response to the query, the server 102 is programmed to determine the queried organization. The text query provided by the first user device can be matched to organization data in the database 220 using a pattern matching technique known to someone skilled in the art based on specific rules. For example, an organization may have subsidiaries or subdomains. Such relations can be stored as part of the organization data or encoded in the organization matching rules. The server 102 is programmed to further identify a list of relationships involving individuals who are related to those user accounts who are in the first user's alliances (or alliance network) and who belong to the organization. Specifically, person data concerning those individuals can similarly be matched to organization data based on specific rules. For each of the list of relationships, the server 102 is programmed to also determine the types of information that are visible to the first user or first user device based on the alliance data, similar to the handling of the query for relationship information associated with a second user who is in an alliance with the first user discussed above. In addition, the server 102 is configured to perform some aggregation on the list of relationships. Such aggregation can include calculating a total number of relationships that correspond to the same individual in the queried organization, an average relationship strength over these relationships, or an aggregate of other types of data visible to the first user over these relationships. Furthermore, the server 102 is programmed to transmit to the first user device the types of information accessible to the first user device regarding the list of relationships, including the aggregation data.

In some embodiments, the server 102 can be programmed to facilitate pursuit of the list of relationships determined for the first user device or any other relationship identified by the server 102. For example, a graphical user interface can be used to enable preparation and delivery of an introductory digital communication from the first user device to a device corresponding to one of the list of relationships with a few simple user interactions. Furthermore, the server 102 can be configured to analyze the calendar events or other digital communications of the first user or of an individual corresponding to one of the list of relationships and determine schedules, communication habits, or common interests of the first user or the individual. Based on the determination, the server 102 can be configured to send suggestions to the first user device on how to establish contact with the individual, subject to privacy or other constraints specified by the individual. For example, upon determining that the first user and the individual will be attending the same conference, a recommendation to make an in-person introduction before or during this conference can be transmitted to the first user device. For further example, upon determining that the individual composes a large volume of email but schedules relatively few (such as lower than 10%) telephone, video, or in-person conferences, a recommendation to make an email introduction initially can be transmitted to the first user device.

Figure 5:
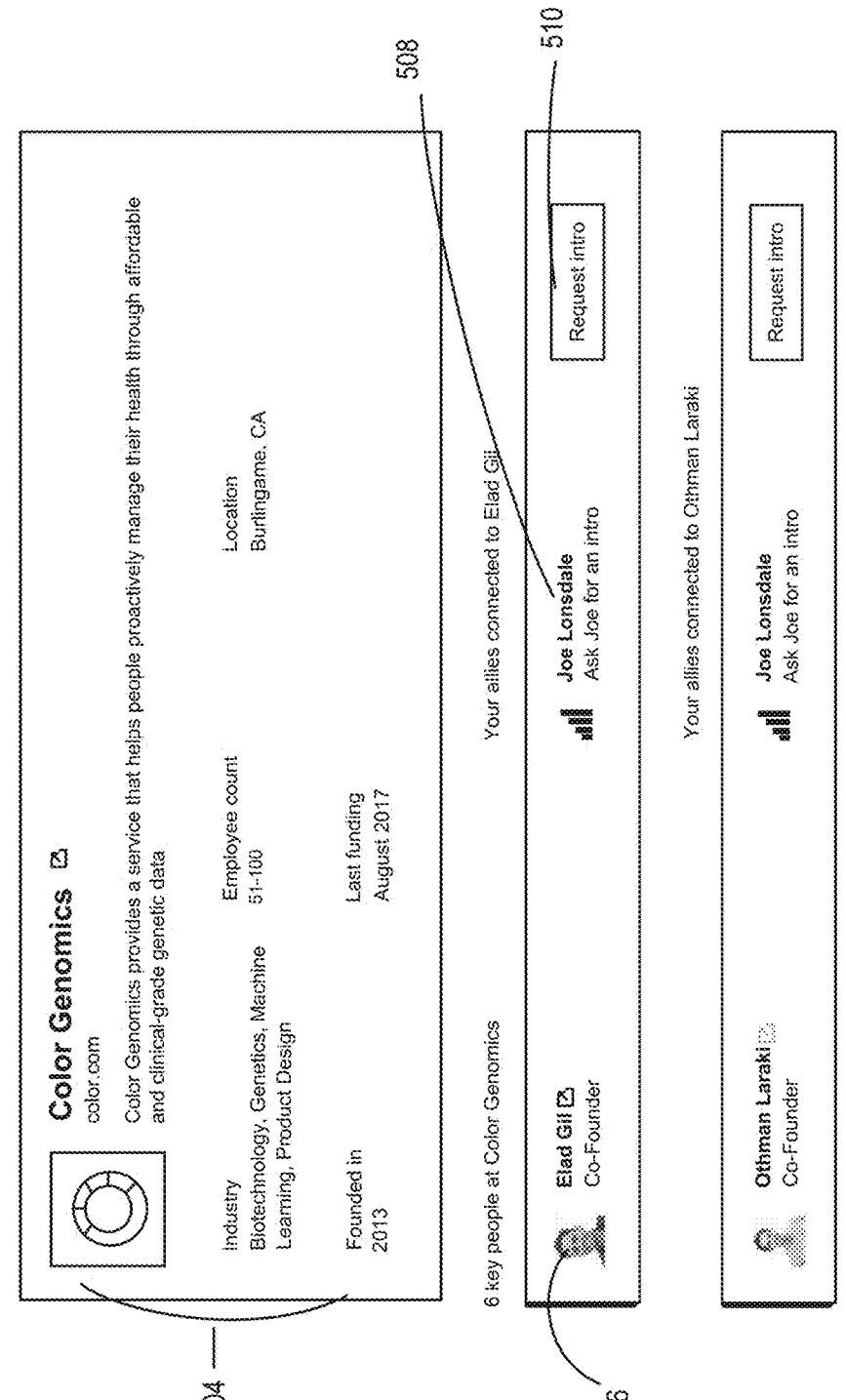
FIG. 5 illustrates an example screen that shows search results in response to a query from a first user device associated with a first user for information regarding relationships associated with an organization.

FIG. 5 illustrates an example screen that shows search results in response to a query from a first user device associated with a first user for information regarding relationships associated with an organization. The screen shows information regarding the queried organization 504, including a name, website, description, industry classification, employee count, location, year of creation, and last time of funding. Additional data regarding the organization stored in the database 220 or less data can be displayed. The screen also shows data regarding a list of relationships involving individuals in the organization who are related to those user accounts who are in the first user's alliances (or alliance network). The screen can also show data regarding one or more allies in the organization. For each of the relationships, the data can include identifying information of the corresponding individual 506, such as a name and an email address, information regarding the relationships that lead to this individual 508, such as names of one or more user accounts who are in the alliance network of the first user's account or communicate with the individual and an indication of an aggregate relationship strength over the one or more user accounts. In addition, the screen can also provide a mechanism 510 that allows the first user to contact the individual through a user associated with one of the allies of the first user's account (or a chain of people associated with the alliance network of the first user). In response to a selection or an activation of this mechanism 510, a default notification can be sent to a device of a corresponding user. Alternatively, another screen corresponding to a new digital communication addressed to that corresponding user can be presented to allow the first user to customize the notification, and the completed digital communication can be delivered to the device of that corresponding user. Alternatively, the screen can show information regarding a communication mechanism to reach the individual directly, as long as such information is visible to the first user to the relevant alliance data.

Figure 6:
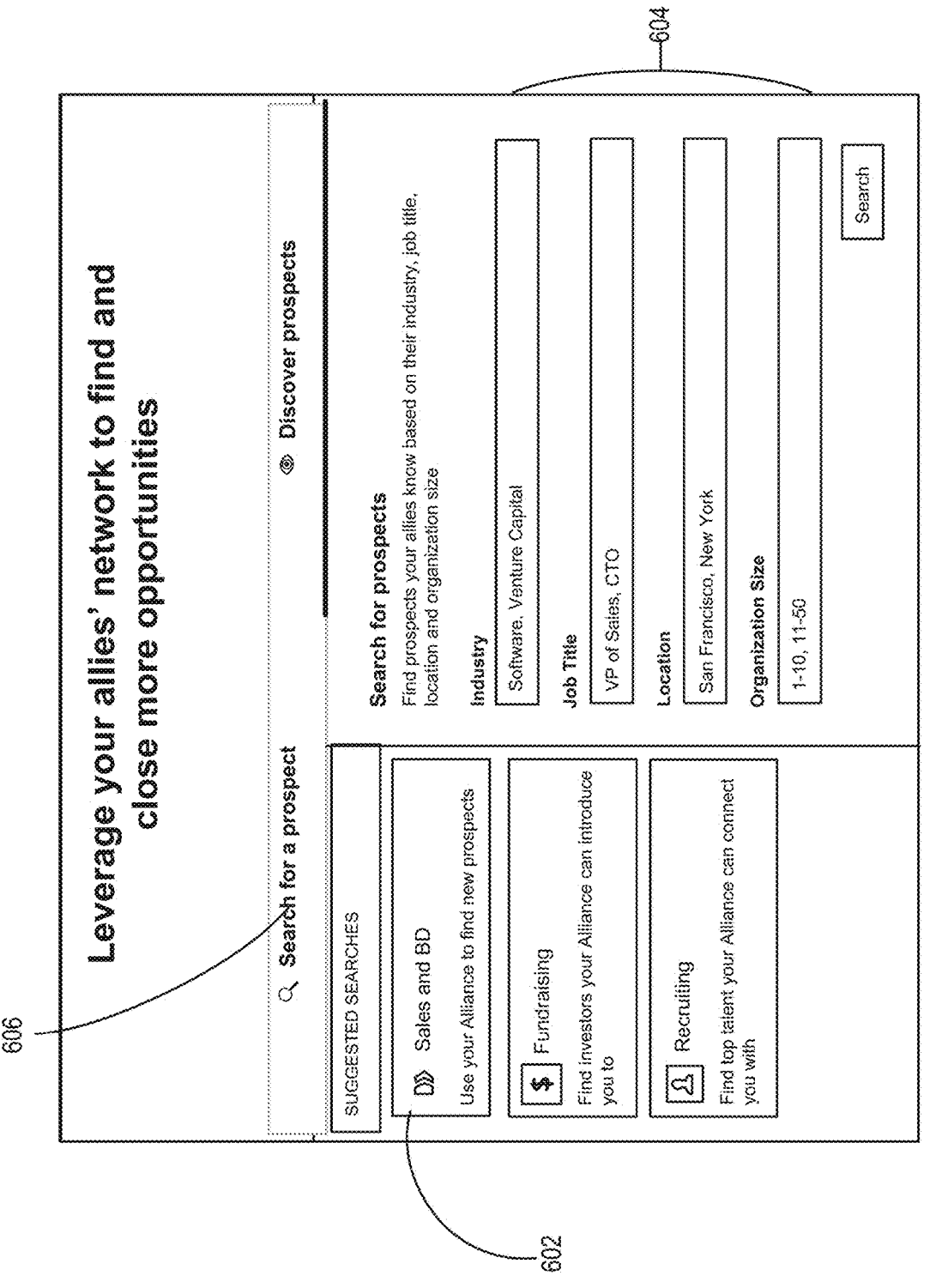
FIG. 6 illustrates an example screen that allows querying for information regarding relationships according to a specific criterion.

In some embodiments, the server 102 is programmed to receive a query for information regarding relationships who satisfy a certain criterion from a first user device. This query is different from a query for information regarding relationships within an organization in that this query is not limited to any organization. Therefore, the relationships found in response to this query can involve individuals who belong to any of multiple organizations or no organization at all. FIG. 6 illustrates an example screen that allows querying for information regarding relationships according to a specific criterion. The screen offers multiple ways to specify the criterion. A user can enter free-form text in the text field 606, such as the title of the position within an organization or the number of years with an organization. The screen also allows the selection of one of the buttons 602 which represent specific industries to which an organization of a prospect may belong, such as fundraising or recruiting, or which represent other specific combinations of attribute values. In addition, the screen allows the input of values into text fields 604 for specific attributes of an organization of a prospect, such as the location or size. The screen may also provide suggestions for these values based on what is already input or data from external sources. For example, in response to an input of "software" as an industry, a suggestion of "hardware" can be presented as a suggestion because these two industries are often searched together. In addition to or instead of the criterion related to an organization of a prospect, a criterion directly related to an individual, such as the age or number of alliances, can also be submitted and processed.

In some embodiments, in response to the query, the server 102 is programmed to determine the queried individuals through their organizations or directly. The query provided by the first user device can be matched to organization data or person data in the database 220 using a pattern matching technique known to someone skilled in the art based on specific rules, similar to the handling of a query for information related to relationships within an organization discussed above. The server 102 is programmed to ultimately identify a list of relationships involving individuals who are related to those user accounts who are in the first user's alliances (or alliance network) and who satisfy the certain criterion, determine the types of information that are accessible to the first user device based on the alliance data for each of the list of individuals, and perform some aggregation on the list of relationships, also similar to the handling of a query for information related to relationships within an organization discussed above.

Figure 7:
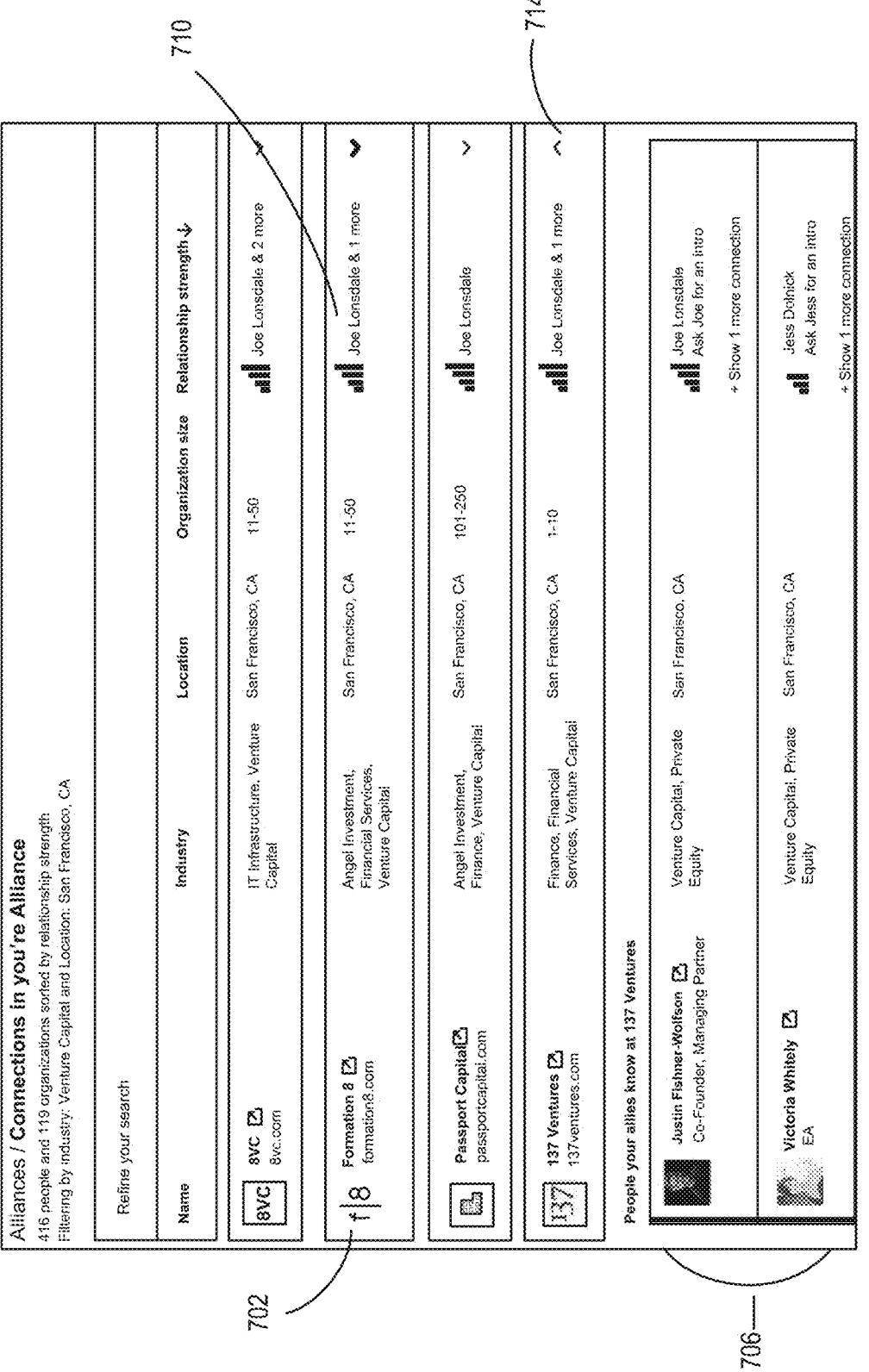
FIG. 7 illustrates an example screen that shows search results in response to a query for information regarding relationships according to a specific criterion.

FIG. 7 illustrates an example screen that shows search results in response to a query for information regarding relationships according to a specific criterion. The screen shows information that is accessible to the first user according to the alliance data regarding each organization that satisfies the query or each organization of an individual that satisfies the query. The information can include identifying information 702, such as the name, a website, or a location, or include values of the attributes that are part of the query. For each of these organizations, the screen also shows aggregate relationship information 710, such as the number of relationships within the organization, the names of one or more user accounts who are in the first user's alliances or alliance network and who communicate with the individuals involved in these relationships, or the average relationship strength over these relationships. For example, for example, for the organization corresponding to the business entity Formation 8, Joe Lonsdale and another user are the first user's allies or are in the first user's alliance network and can be relied on to reach an individual who work for Formation 8. More detailed relationship information can also be shown. In this example, individual-level information 806 is shown as an expansion of the organization-level information, indicating information regarding the list of relationships within the organization. The user can choose to see such expanded information through a toggle 714. The screen can additionally show a list of relationships who do not belong to any organization.

In some embodiments, the server 102 is programmed to identify or suggest prospective allies or prospective contacts for a user or user device. Specifically, the server 102 can be configured to analyze the user's search history, the user's own digital communications including a corresponding communication history, the allies' search histories, or the digital communications of the user's allies that are explorable according to the alliances including a corresponding communication history. Based on the analysis, the server 102 can be configured to then identify individuals who satisfy a certain criterion predetermined by the server 102 or provided by user device. Such criteria might apply to the individual, any organization to which the individual belongs, or the relationship with the user or an ally of the user. For example, one criterion may be a contact who is a manager in a technology company who communicated with the user or an ally within the last six months. Another criterion may be an individual who is at a higher position than an existing contact (with whom the user has communicated) and with whom no other employee of the user's employer has had any digital communication. The server 102 can be programmed to further distinguish between prospective allies and prospective contacts based on specific criteria, such as the strength of the relevant relationship with the prospect, the job title of the prospect, etc. The server 102 can be programmed to determine such prospective allies or contacts according to a specific schedule or upon request by the user device and send appropriate information regarding these prospects to the user device.

In some embodiments, the server 102 is programmed to further estimate the impact of forming an alliance and communicate such estimated impact to a user device to assist the user device in deciding how to form additional alliances. The server 102 can be programmed to estimate the impact for each identified prospective ally or contact, as discussed above, or use the estimated impact to improve the identification of prospective allies or contacts. Subject to privacy or other constraints associated with each user account, the server 102 can be configured to compute certain statistics based on the relationships associated a specific user account. The statistics can be related to the relationships that can be derived from digital communications in one of the communication accounts associated with the specific user account or various attributes of these relationships. For example, the statistics can include a total count of relationships that are new to the user device, an average age of the individuals corresponding to the new relationships, or the number of different employers of those individuals. For further example, the user account might give priority to forming an alliance with the specific user account when the user account is associated with an employer in the food industry and when the statistics show that the new relationships that can be explored as a result of the alliance are associated with many employers in the food industry.

4.3. Enhancing Online Contents Based on Digital Alliance Data

In some embodiments, the server 102 is programmed to store a client program comprising computer-executable instructions. For example, the client program can be implemented as a browser add-on or another form of extension. In response to a request from a user device associated with a user account for the client program, the server 102 is programmed to then transmit the client program to the user device. Alternatively, the server 102 can be programmed to transmit the client program to a certain management system, which is configured to further transmit the client program to the user device in response to a request from the user device. For example, the management system can be associated with a browser developer and configured to manage a list of add-ons or extensions.

In some embodiments, the user device via the client program is configured to receive online contents including a digital document, such as a webpage. The user device is further configured to extract relevant data from the body or metadata of the digital document. The metadata may include the original address of the digital document or the location or identifier of the sender of the digital document, for example. The relevant data can include a name, an email address, a domain name, or another piece that can be mapped to an item identifying a user or a contact in the digital alliance data. The user device can be configured to specifically look for relevant data or consider each portion of the body or metadata of the digital document as a candidate for relevant data. For example, an email address can be easily recognized from the presence of the "@" character, and an entity name may be found from the presence of a "<name>" tag. For further example, a domain name that can be mapped to an organization may be recognized from the presence of the ".com" characters or other similar forms. More generally, as the URL of a webpage corresponds to an internationally accepted format, the domain name can be obtained from structured parsing and extraction of the "hostname" in the accepted format. In some cases, the structure of the digital document is known. For example, when the user device communicates frequently with a mail server or a social media server, the structure of the Inbox webpage presented by the mail server or the structure of an online user profile presented by the social media server may be available to the user device. Thus, the user device can be configured to directly extract relevant data from specific locations of the digital document according to the corresponding structure information. In some cases, the user device is configured to look for specific types of relevant data based on certain information regarding the digital document. For example, when the digital document is provided by a corporate website and the title of the webpage includes certain words, such as "About", "People", "Team", "Advisory Board", or "Management", the user device can be configured to extract an identifier of the employer, a name, and a job title for at least one individual as relevant data.

In some embodiments, the user device via the client program is configured to determine whether the relevant data matches the digital alliance data. The user device can be configured to determine whether the relevant data corresponds to a contact of the alliance network of the user account. The user device can also be configured to determine whether the relevant data corresponds to an organization employing a contact of the alliance network of the user account. When a local copy of the digital alliance data concerning the alliance network of the user account is available on the user device, the user device can be configured to determine whether there is a match using any comparison technique known to someone skilled in the art. For example, an exact match can be identified for email addresses, a fuzzy match with a relatively low tolerance can be identified for names, and a fuzzy match with a relatively high tolerance can be identified for facial images or logos. The relevant data might include multiple items, such as a name and an email address, and whether there is a match can depend on the results of comparing the multiple items with the digital alliance data.

In some embodiments, in response to a match between the relevant data and the digital alliance data, the user device via the client program is configured to determine how to enhance the online contents or specifically the digital document. The user device can be configured to update the digital document in stages so that additional changes are incorporated and displayed in response to one or more subsequent user requests for more information. For example, a summary of the matching result can be initially added to a certain location of the digital document and displayed; in response to any user interaction with that certain location of the digital document or a similar user request for more information, details of the matching result can be further added to the digital document and displayed. The certain location can be a fixed location, such as one side of the digital document as a sidebar that does not interfere with the body of the original digital document, or a context-dependent position, such as an area near the location of the extracted relevant data. The user device can be configured to determine when each stage begins, which data to display in each stage, or how to display the data according to user preferences in the user account.

In some embodiments, the user device via the client program is configured to update the digital document with specific data related to contacts of the alliance network of the user account. Typically, the specific data includes basic information regarding the contact, such as the name, email address, job title, job location, job industry, or name of the employer of the contact, that is not already in the digital document. The user device can be configured to update the digital document further with additional data related to at least one alliance network member that has offered any digital document for exploration of relationships involving the contact. The additional data may include basic information regarding the alliance network member, a communication path for the user of the user account to connect with the contact through the user of the alliance network member, or a communication score of the communication path indicating how successful the connection or relationship between the user of the user account and the contact will be. As noted above, the communication path includes a series of user accounts from the user account to the alliance network member such that each pair of successive accounts are in an alliance. The communication score can be based on a length of the communication path (or the degree of the alliance network where the alliance network member belongs) or a strength of the relationship between the alliance network member or the associated user and the contact. The additional data can also include aggregate metrics, such as a total number of network alliance members that have offered digital documents for exploration of relationships involving the contact, or a maximum or an average communication score over all the communication paths for the user of the user account to connect with the contact.

In some embodiments, when no local copy of the digital alliance data regarding the alliance network of the user account is available on the user device, the user device via the client program is configured to send a request including the relevant data and information identifying the user account to the server 102 for determining whether the relevant data matches the digital alliance data. In response to the request, the server 102 is programmed to determine whether the relevant data corresponds to a contact of the alliance network of the user account or an organization employing a contact of the alliance network of the user account, as noted above. The server 102 is programmed to further determine which types of data from the matched digital alliance data are to be inserted into the digital document and send these types of data to the user device. Instructions for displaying these types of data can also be sent when they are not incorporated into the client program. The server 102 can be programmed to send these types of data all at once or incrementally in response to subsequent requests for additional information from the user device.

FIGS. 9A, 9B, 10A, 10B, 10C, 10D, 11A, 11B, 11C, 12A, 12B, 13A, and 13B provide illustrations of online contents enhanced by a user device via the client program. These figures are for illustration purposes only. The graphical components in these figures may have other shapes or forms or in other arrangements. More or fewer graphical components may be included in such arrangements.

Figure 9A:
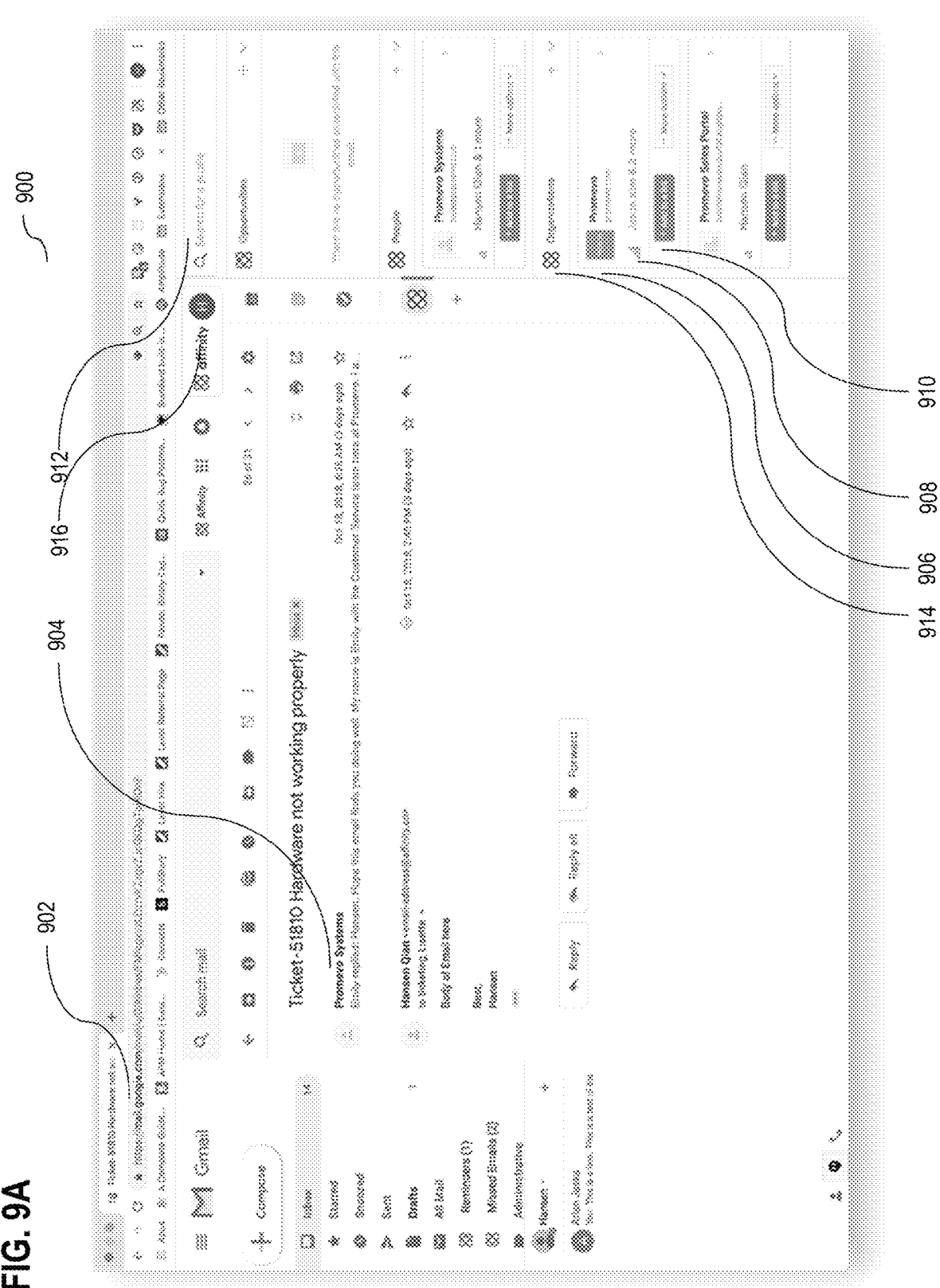
FIG. 9A illustrates an example webpage provided by a mail server with initial enhancement made by a user device receiving the webpage.

FIG. 9A illustrates an example webpage provided by a mail server with initial enhancement made by a user device receiving the webpage. In some embodiments, the screen 900 includes the webpage that corresponds to an email message provided by Gmail, which can be determined from the URL 902 of the webpage or the contents of the webpage. The user of the user device in this case is named Hansen Qian. Information regarding the sender, the receiver, or another party involved in the email message, such as the name and/or email address of Promevo Systems, can be extracted from an appropriate area 904 as relevant data and matched with the digital alliance data. While the user is already communicating with Promevo Systems, Promevo Systems can be recognized as an organization and individuals working for Promevo Systems or related organizations as members or contacts of the alliance network of the user account can be identified to facilitate communication with Promevo Systems. The screen 900 also includes a sidebar 912 with certain digital alliance data matched to the relevant data, which can be displayed when the original webpage is displayed or in response to a subsequent user request, which might have been shown before the webpage was received. The sidebar 912 can include various sections, including a section 914 corresponding to one or more other organizations related to Promevo Systems, which can be identified from publicly available data on organizational structure, for example. The section 914 includes a first sub-section 906 with information regarding the first organization Promevo, such as an identifier of the first organization and a summary 908 of alliance network members that have offered digital communications for exploration of relationships involving an individual employed by the first organization. The subsection 906 also includes an option 910 for adding the data presented in the sub-section 906 into a list for future retrieval.

Figure 9B:
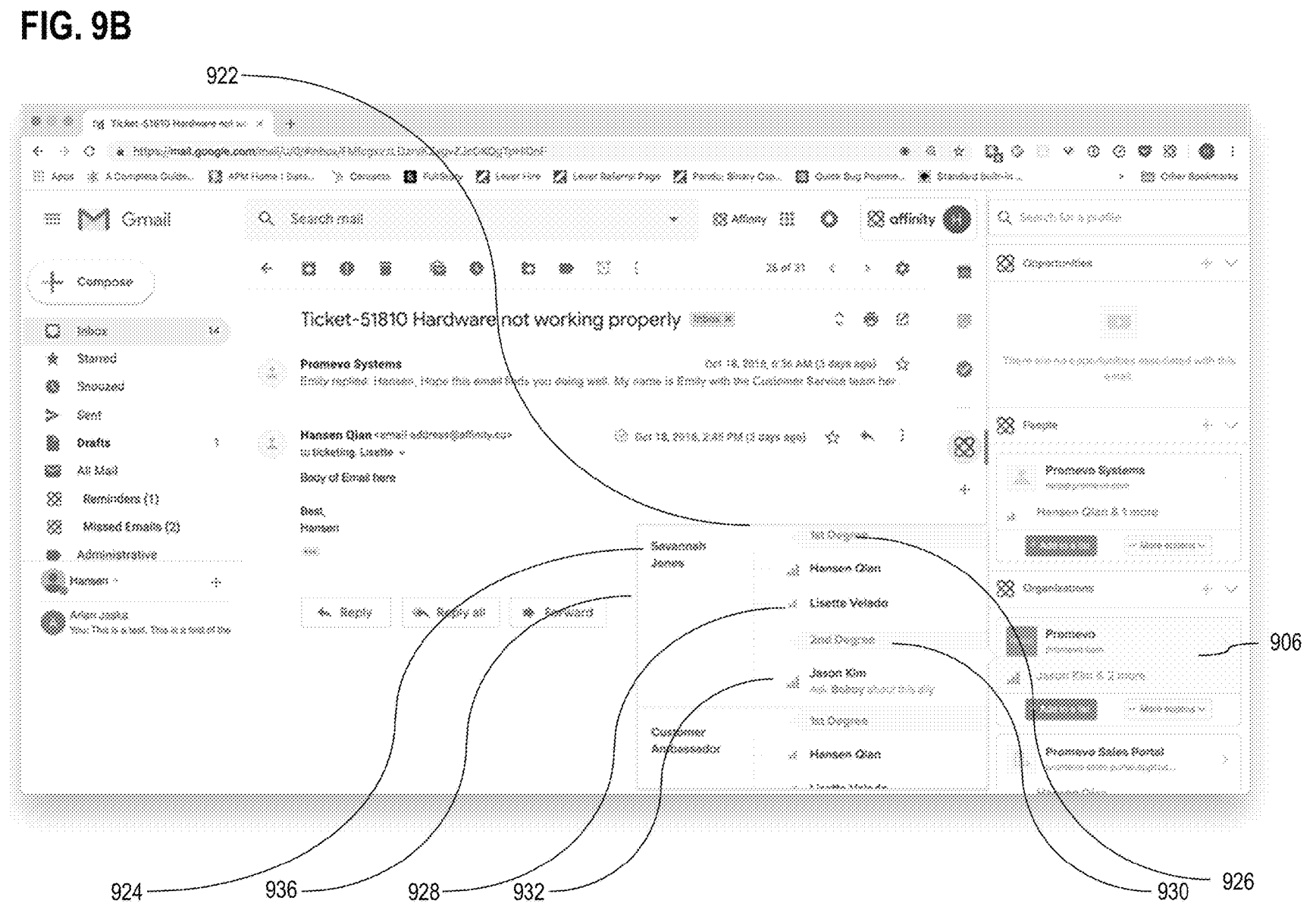

FIG. 9B illustrates the example webpage provided by the mail server with subsequent enhancement made by the user device receiving the webpage. In some embodiments, the section 922 as an expansion of the sub-section 906 is displayed in response to a user request, such as moving a cursor over the subsection 906. The section 922 includes an area for each contact of the alliance network of the user account employed by the first organization Promevo, such as the area 936 for the first contact Savannah Jones, which can again be identified from publicly available data on organizational structure. The contact can also have been identified from the email message. The area 936 includes a section 924 with information identifying the first contact and further sub-sections for different groups of members of the alliance network who have offered digital communications for exploration of relationships involving the first contact, including the sub-section 926 for first-degree alliance network members and the sub-section 930 for second-degree alliance network members. The sub-section 926 includes an area related to each first-degree alliance network member, such as the area 928 with the name Lisette Velado and an aggregate communication score of all communication paths for the user Hansen to connect with the first contact Savannah through Lisette or simply an indicator of the strength of the relationship between the Lisette and the first contact Savannah. The sub-section 930 includes an area related to each second-degree alliance network member, such as the area 932 with the name Jason Kim, and an aggregate communication score or an indicator of relationship strength, and the name Bobby associated with a first-degree alliance network member that is an ally of both Hansen's user account and Jason's user account, which can enable submission of a request to a user device associated with Bobby for more information regarding Jason. Therefore, to facilitate communication with Promevo system, the user Hansen may reach out to Bobby and subsequently to Jason for an introduction to the first contact Savannah, who might know someone employed by Promevo Systems, when Hansen believes that Jason has a better relationship with Savannah than he does, for example.

Figure 10A:
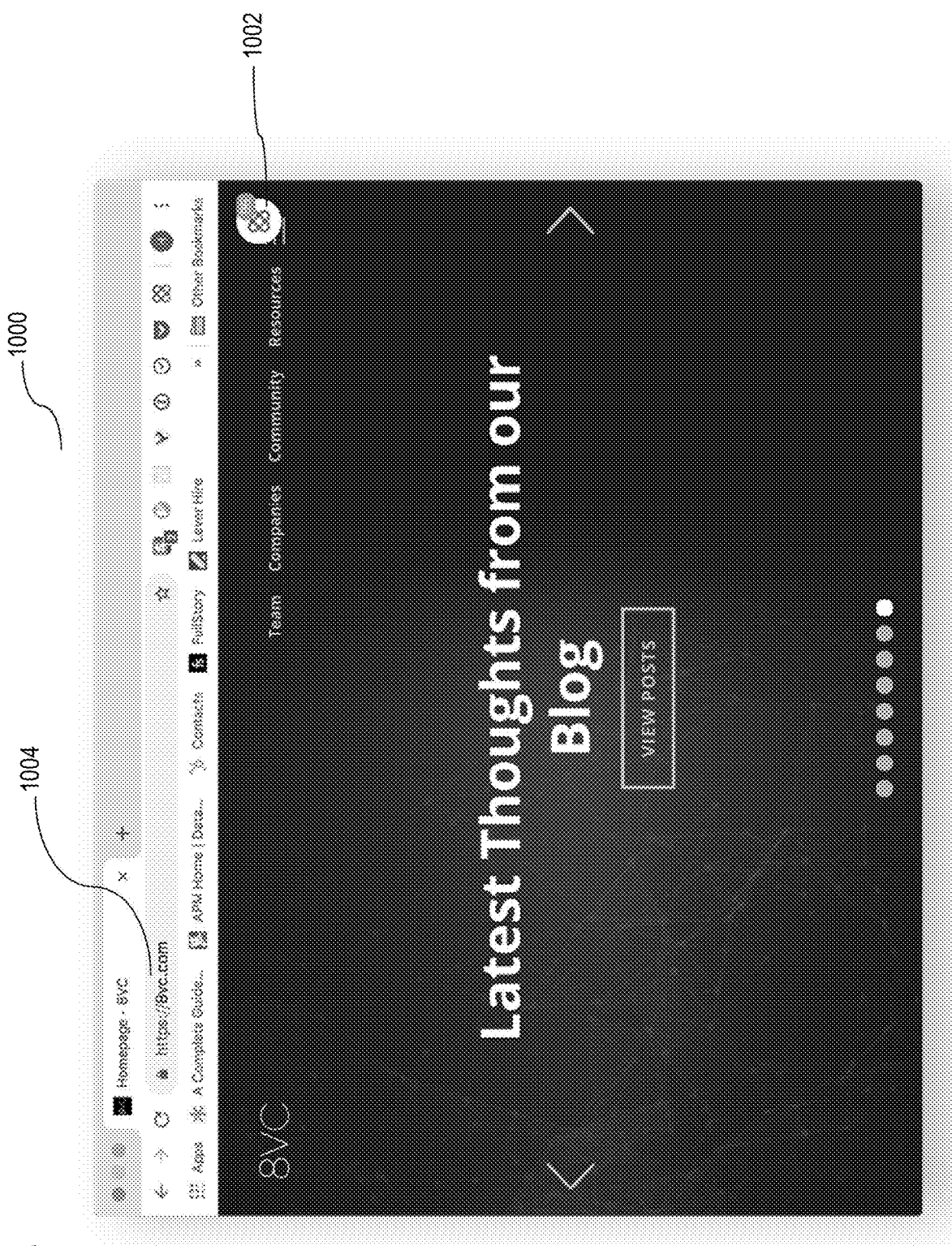
FIG. 10A illustrates an example webpage provided by an organizational server with initial enhancement made by the user device receiving the webpage.

FIG. 10A illustrates an example webpage provided by an organizational server with initial enhancement made by the user device receiving the webpage. In some embodiments, the screen 1000 includes the home page of 8VC, which can be determined from the URL 1004 of the webpage or the contents of the webpage. Any identifier of 8VC can then be extracted as relevant data and matched with the digital alliance data. Just like Promevo Systems, 8VC can be recognized as an organization and individuals working for 8VC as members or contacts of the alliance network of the user account associated with the user device can be identified to facilitate communication with the organization. The screen 1000 includes an icon 1002 that shows a summary of the matched digital alliance data, such as the total number of contacts of the alliance network of the user account employed by 8VC. In order for the icon 1002 to be as unobtrusive as possible without blocking any webpage content, the user can be allowed to use their cursor to move the icon 1002 around the webpage.

Figure 10B:
FIG. 10B illustrates the example webpage provided by the organizational server with subsequent enhancement made by the user device receiving the webpage.

FIG. 10B illustrates the example webpage provided by the organizational server with subsequent enhancement made by the user device receiving the webpage. In some embodiments, in response to a user request, such as moving a cursor over the icon 1002, the section 1022 as an expansion of the icon 1002 is displayed next to the icon 1002 or in another location. The section 1022 includes a summary 1012 that corresponds to the summary associated with the icon 1002.

The section 1022 can also include a sub-section for select contacts of the alliance network of the user account employed by 8VC, such as the sub-section 1014 for the contact Jonathan Lee having the strongest connection with an alliance network member. How strong the connection is can be measured by an aggregate communication score over all the communication paths for the user associated with the user device to connect with the contact Jonathan, for example. More specifically, the sub-section 1014 includes a sub-section 1016 with basic information regarding the contact Jonathan, such as the name and the job title, and a sub-section 1018 with certain information regarding one or more alliance network members to the user account who offered digital communications for exploration of relationships involving the contact, such as the name Emily Smith associated with an alliance network member being in the lowest degree of the alliance network and/or having the highest strength of the relationship with the contact. Therefore, to facilitate communication with 8VC, the user of the user device may reach out to Emily for an introduction to the contact Jonathan employed by 8VC.

Figure 10C:
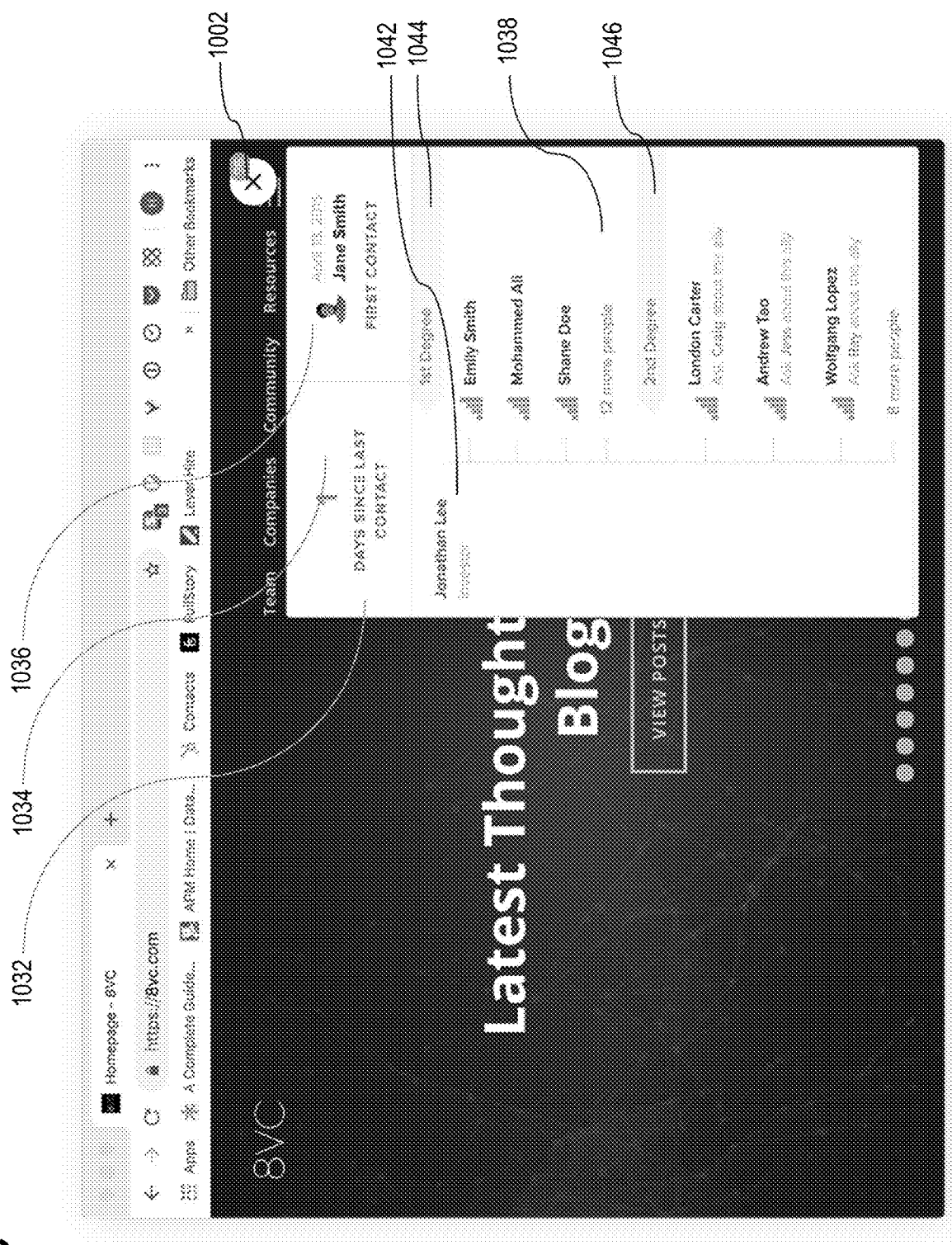
FIG. 10C illustrates the example webpage provided by the organizational server with subsequent enhancement made by the user device receiving the webpage.

FIG. 10C illustrates the example webpage provided by the organizational server with subsequent enhancement made by the user device receiving the webpage. In some embodiments, in response to a user request, such as moving a cursor over the icon 1002 or the button 1020 illustrated in FIG. 10B, the section 1032 is displayed as an expansion of the icon 1002 next to the icon 1002 or an extension of the section 1022 instead of the section 1022. The section 1032 includes a sub-section 1036 that shows basic information about an user associated with an alliance network member who first had communication with the organization, such as the name of Jane Smith, the date of Apr. 18, 2015 when the the alliance network member first conducted communication with any contact associated with the organization, and an index of the alliance network member in communicating with the organization, in this case the initial or first contact. The section also 1032 includes a sub-section 1034 that shows the number of days since the last communication between an alliance network member and a contact associated with 8VC or the date of the last digital communication offered by an alliance network member for exploration of relationships involving the contact, in this case one (1). Such a number of days might indicate as a measure of the "freshness" of the overall relationship between the first contact and the alliance network of the user account. The section 1032 also includes a sub-section 1042 with basic information regarding the contact with the highest score for a communication path connecting the an alliance network member with the contact and further sub-sections for different groups of alliance network members who have offered digital communications for exploration of relationships involving the first contact, such as the sub-section 1044 for first-degree alliance network members and the sub-section 1046 for second-degree alliance network members. The sub-sections 1042, 1044, and 1046 are similar to the sub-sections 924, 926, and 930 illustrated in FIG. 9B, respectively. More specifically, each of the sub-sections 1044 and 1046 can have information regarding a select number of the alliance network members in the group and include a link to an area with additional information regarding the rest of the alliance network members in the group, such as the link 1038.

Figure 10D:
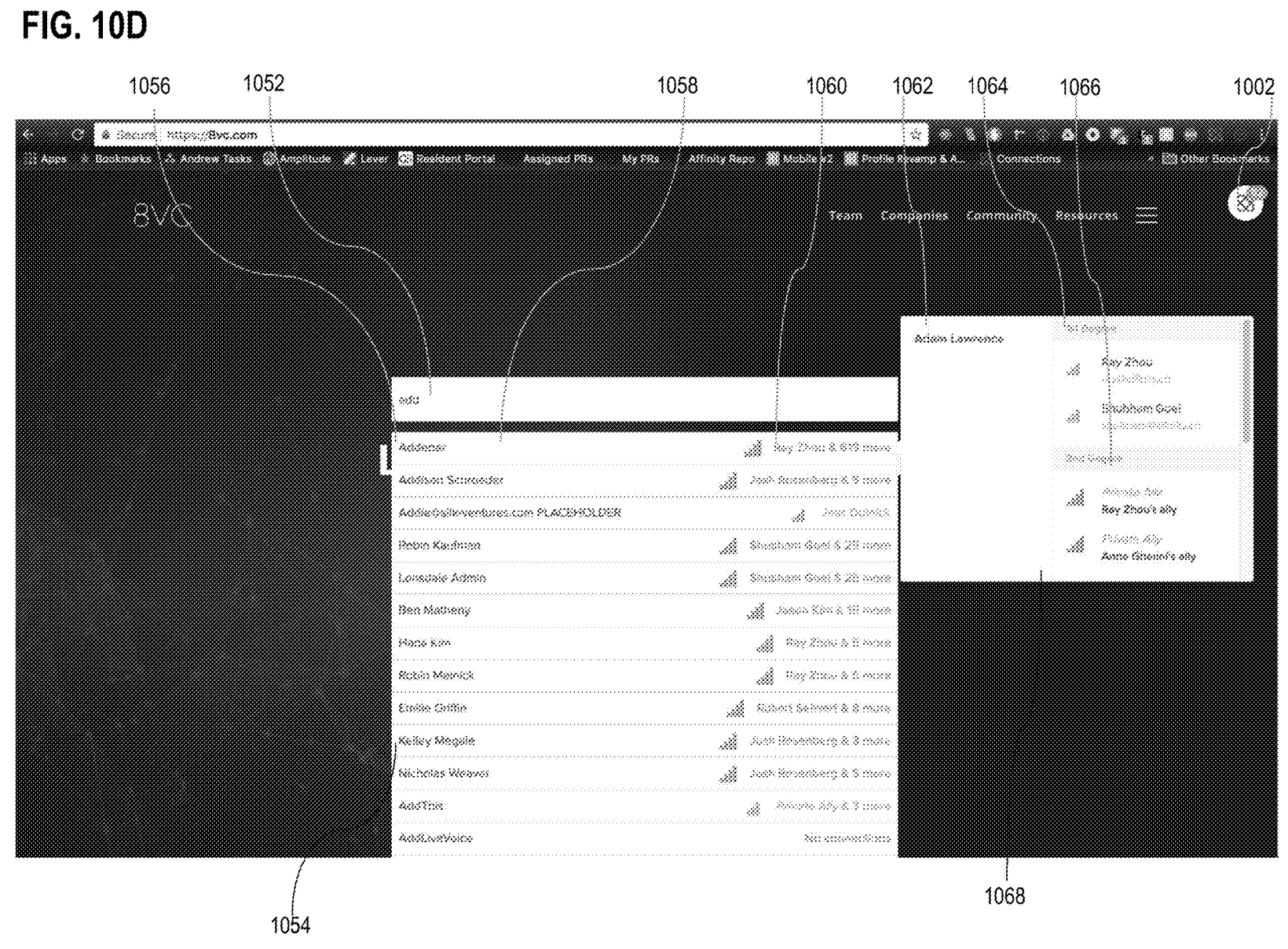

FIG. 10D illustrates the example webpage provided by the organizational server with subsequent enhancement made by the user device receiving the webpage. In some embodiments, in response to a user request, such as clicking the Affinity icon 1002 in the browser's toolbar or by pressing a specific keyboard key combination that is recognized by the client program, the section 1052 is displayed as an expansion or an extension near the center of the webpage or in another location. The section 1052 can act as a search box that enables a search of the group of contacts. A further user request, such as entering a query into the search box, may be received, and the further user request can be extracted as additional relevant data and matched with the digital alliance data. Data extracted from the webpage, such as information regarding the organization 8VC, can be used to refine the matching process, such as assigning higher scores to search results related to 8VC or restricting the search results to only those contacts employed by 8VC. The section 1054 that includes certain digital alliance data matched with the additional relevant data can then be displayed next to the section 1052 or in another location. More specifically, the section 1054 includes a sub-section for each matching contact or each organization employing matching contacts, such as the sub-section 1058. The content of the section 1054 can be refreshed as the search query is updated. The sub-section 1058 can include an area 1056 with basic information regarding the one contact, such as the name "Addepar" of an organization that is related to 8VC, and an area 1060 with certain information regarding one or more alliance network members who have offered digital communications for exploration of relationships involving the one contact, such as an identifier of the one alliance network member Ray Zhou or an aggregate communication score over all the communication paths for the user associated with the user device to connect with the one contact Addepar. For example, the one contact may be associated with the highest aggregate communication score or the largest number of network alliance members of the user account, and the one alliance network member Ray could be associated with the lowest-degree of the alliance network and/or the highest strength of the relationship with the one contact Addepar.

In some embodiments, in response to another user request, such as moving a cursor over the sub-section 1056, the section 1068 can be displayed next to the sub-section 1056 or in another location. The section 1068 includes a sub-section 1062 showing basic information regarding the one organization Addepar, such as the name Adam Lawrence employed by Addepar, and further sub-sections for different groups of alliance network members who have offered digital communications for exploration of relationships involving the one contact Adam, such as the sub-section 1064 for first-degree alliance network members and the sub-section 1066 for second-degree alliance network members. The sub-sections 1062, 1064, and 1066 are similar to the sub-sections 924, 026, and 930 illustrated in FIG. 9B, respectively. Therefore, to facilitate communication with Addepar or specifically the one contact Adam employed by Addepar, the user associated with the user device may reach out to the user associated with an alliance network member listed in the sub-section 1066, such as Ray Zhou, for an introduction. In other embodiments, in response to another user request, such as moving a cursor over the sub-section below the sub-section 1056 for a contact instead of an organization, a section similar to the section 1064 can be displayed.

Figure 11A:
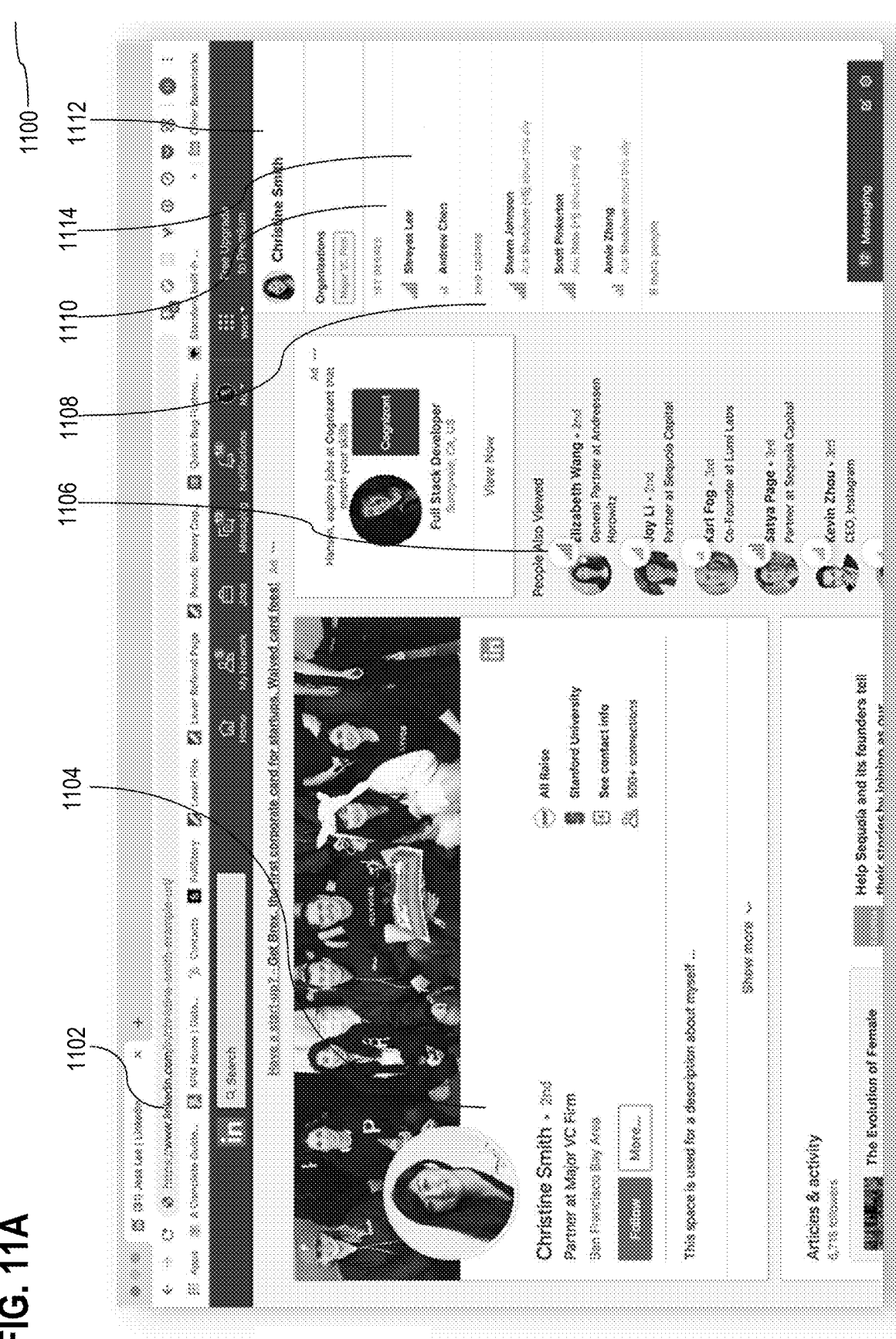
FIG. 11A illustrates an example webpage provided by a social media server with initial enhancement made by a user device receiving the webpage.

FIG. 11A illustrates an example webpage provided by a social media server with initial enhancement made by a user device receiving the webpage. In some embodiments, the screen 1100 includes the webpage that corresponds to a user profile of an individual managed by LinkedIn, which can be determined from the URL 1102 of the webpage or the contents of the webpage. The user of the user device in this case is named Hansen Qian. Information regarding the individual, such as the name Christine Smith, the job title, or an identifier of employer, or hidden identifiers embedded in the webpage metadata, can be extracted from an appropriate area 1104 as the relevant data and matched with the digital alliance data. In this example, the individual Christine is identified as a contact of the alliance network of the user Hansen. The screen 1100 includes a sidebar 1112 with digital alliance data matched to the relevant data, which can be displayed when the original webpage is displayed or in response to a subsequent request. The sidebar 1112 can include different sections for different groups of alliance network members to the user account associated with the user device who have offered digital communications for exploration of relationships involving the contact Christine, such as the section 1110 for first-degree alliance network members and the section 1108 for second-degree alliance network members. The sections 1110 and 1108 are similar to the sub-sections 926 and 930 illustrated in FIG. 9B, respectively. More specifically, the section 1110 includes an area 1114 with information regarding a first first-degree alliance member, such as the name Shreyes Lee and an aggregate communication score of all communication paths for Hansen to connect with the contact Christine through Shreyes or simply an indicator of a strength of the relationship between Shreyes and the contact Christine. Therefore, to facilitate communication with the contact Christine, the user Hansen may reach out to Shreyes for an introduction.

The user profile also contains the "People Also Viewed" section, which contains data regarding a group of individuals, such as Elizabeth Wang, whose user profiles managed by LinkedIn have been viewed by some of those who have viewed the present user profile. There is a good probability that one of the group of individuals knows Christine. For example, someone might have viewed the individual Elizabeth's user profile by following a reference to that profile in the contact Christine's account with LinkedIn or from exploring user profiles managed by LinkedIn of all members of a certain organization to which both the contact Christine and the individual Elizabeth belong. In some embodiments, information regarding the individual Elizabeth can also be extracted as relevant data and matched with the digital alliance data. In this example, the individual Elizabeth is also identified as a contact of the alliance network of the user Hansen. An icon 1106 that shows a summary of the digital alliance data matched to the relevant data is then displayed near the location where information regarding the contact Elizabeth is displayed. The icon 1106 indicates an aggregate communication score over all the communication paths for the user Hansen to connect with the contact Elizabeth, for example.

Figure 11B:
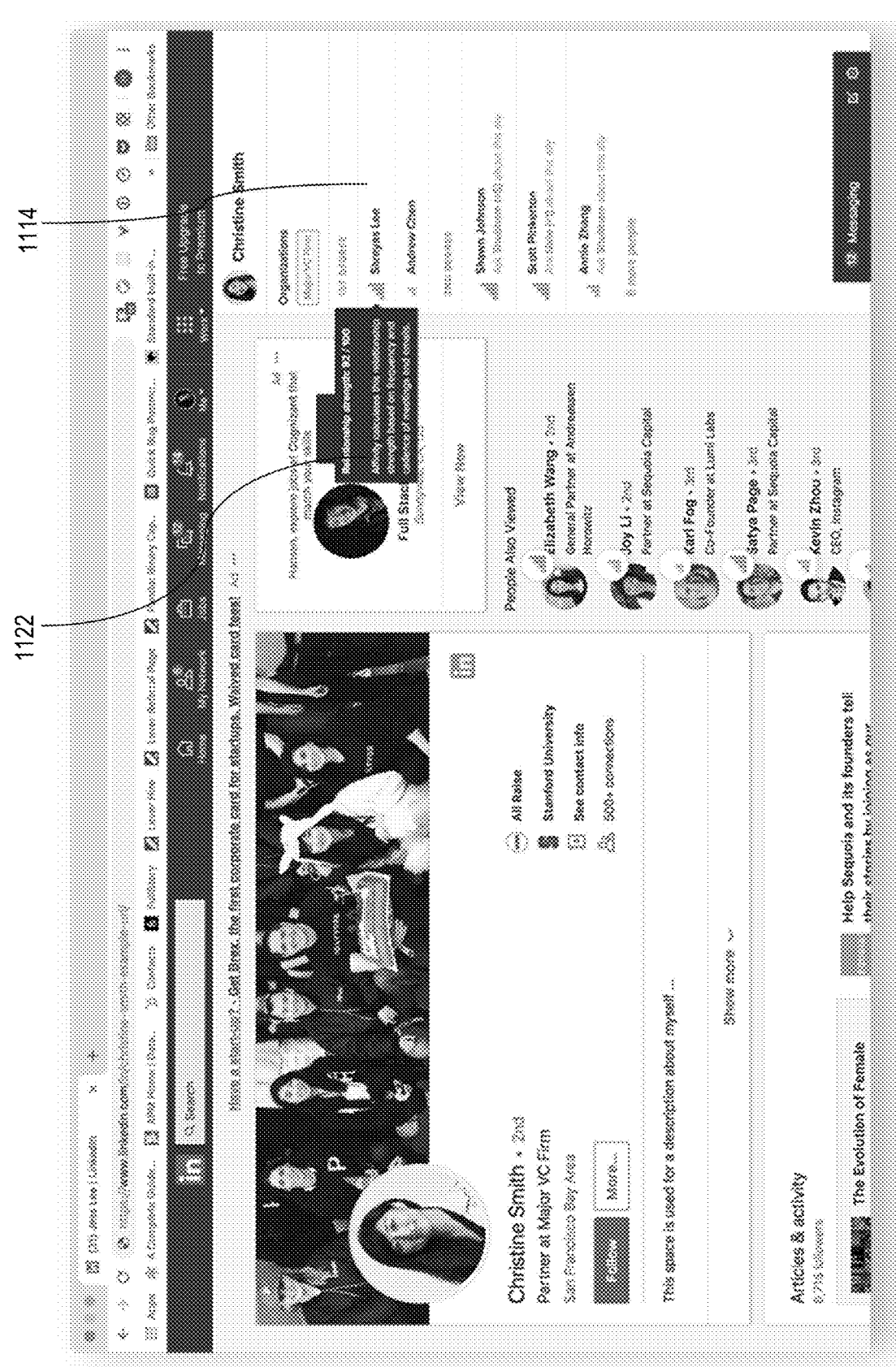
FIG. 11B illustrates the example webpage provided by the social media server with subsequent enhancement made by a user device receiving the webpage.

FIG. 11B illustrates the example webpage provided by the social media server with subsequent enhancement made by a user device receiving the webpage. In some embodiments, in response to a user request, such as moving a cursor over the area 1114, the section 1122 as an expansion or clarification of the are 1114 is displayed next to the section 1114 or in another location. The section 1122 includes certain details regarding how the aggregate communication score or the relationship strength indicated in the section 1114 strength is calculated and what the actual numerical value is.

Figure 11C:
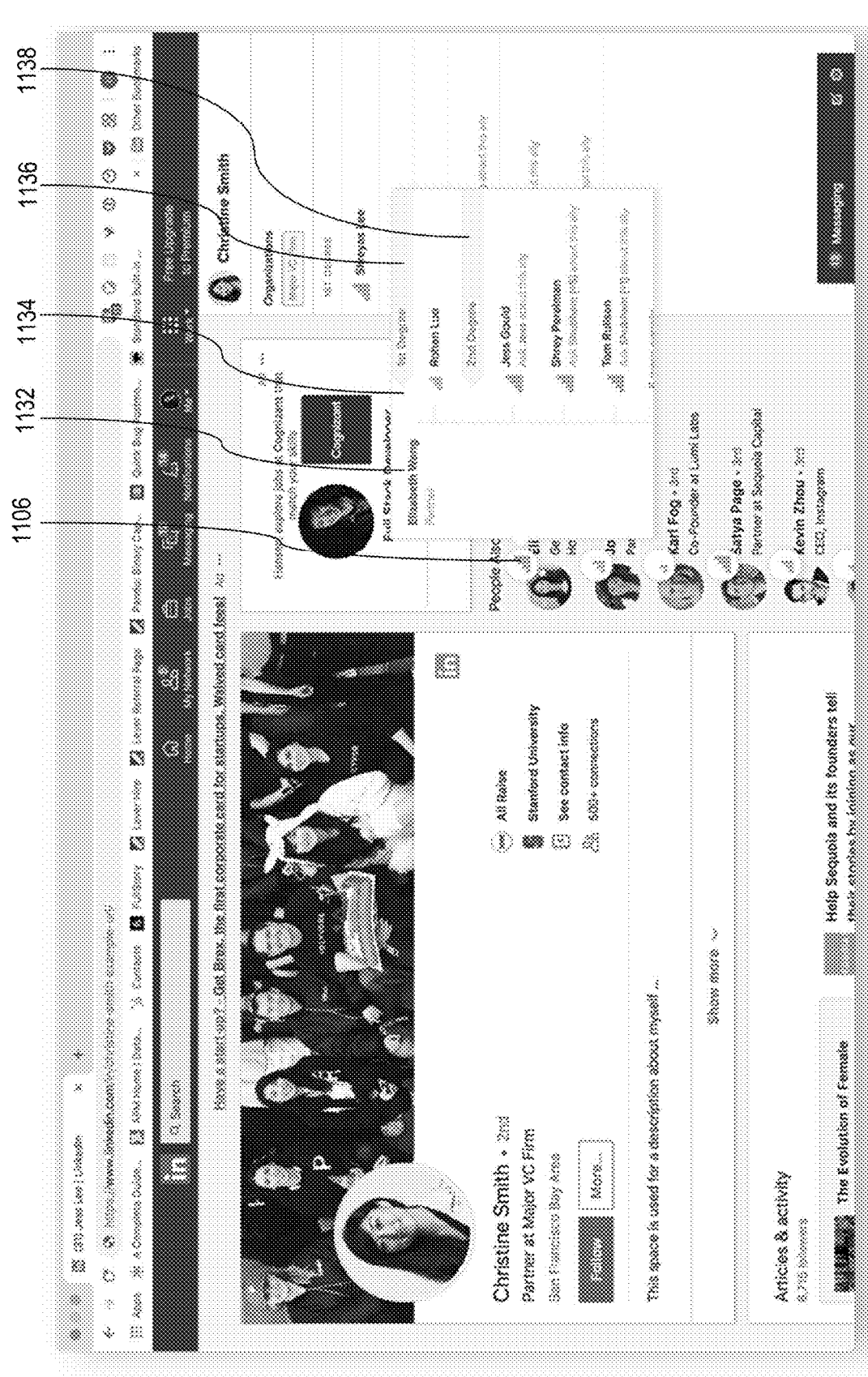
FIG. 11C illustrates an example webpage provided by the social media server with subsequent enhancement made by the user device receiving the webpage.

FIG. 11C illustrates an example webpage provided by the social media server with subsequent enhancement made by the user device receiving the webpage. In some embodiments, in response to a user request, such as moving a cursor over the icon 1106, the section 1134 is displayed as an expansion of the icon 1106 next to the icon 1106 or in another location. The section 1034 includes a sub-section 1132 showing basic information regarding the contact Elizabeth and further sub-sections for different groups of alliance network members who have offered digital communications for exploration of relationships involving the contact Elizabeth, such as the sub-section 1136 for first-degree alliance network members and the sub-section 1138 for second-degree alliance network members. The sub-sections 1132, 1136, and 1138 are similar to the sub-sections 924, 926, and 930 illustrated in FIG. 9B, respectively. Therefore, to facilitate communication with the contact Elizabeth, Hansen may reach out to the user associated with an alliance network member listed in the sub-section 1136, such as Rohan Luo, for an introduction to the contact Elizabeth.

Figure 12A:
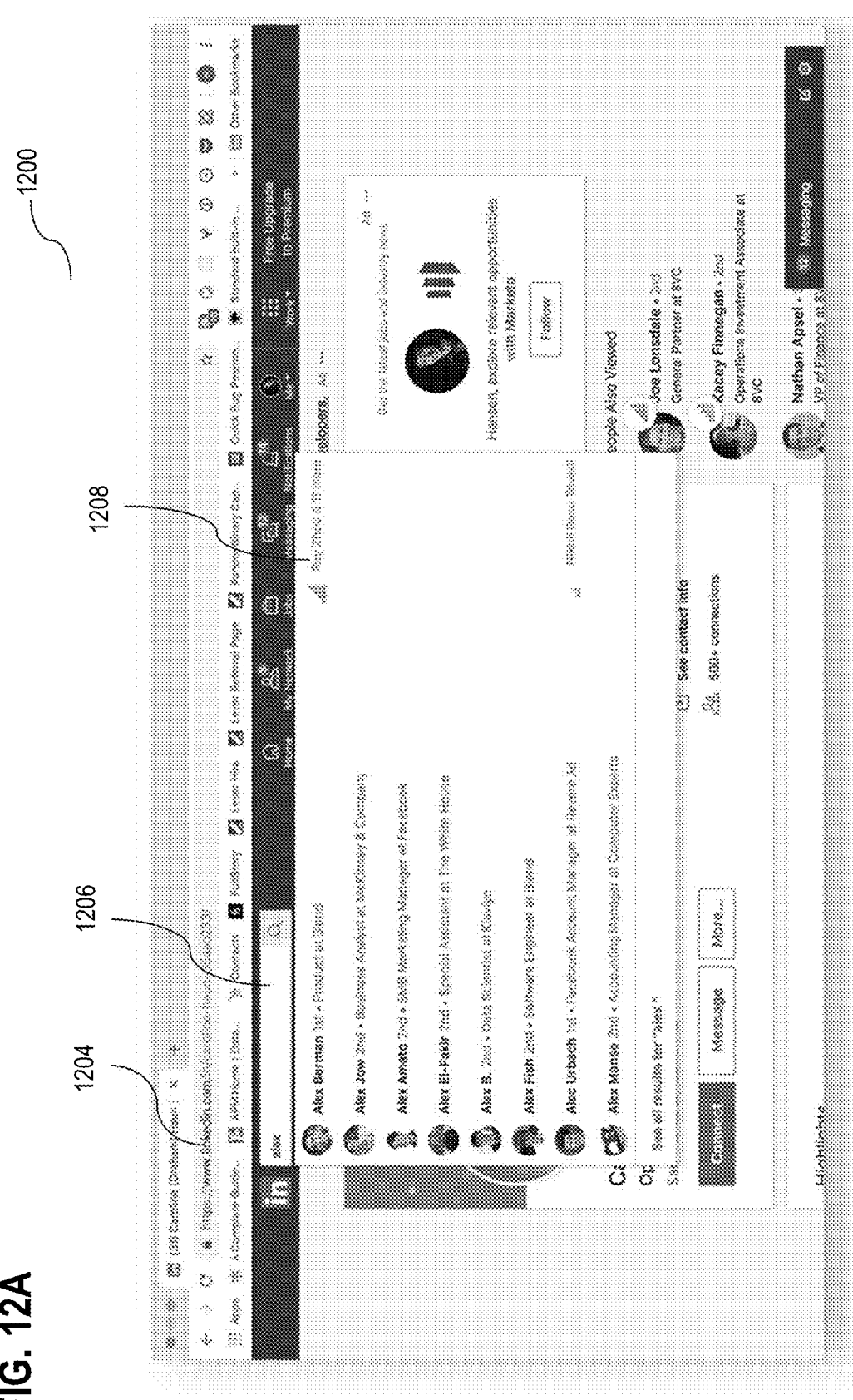
FIG. 12A illustrates an example webpage provided by a social media server with initial enhancement made by a user device receiving the webpage.

FIG. 12A illustrates an example webpage provided by a social media server with initial enhancement made by a user device receiving the webpage. In some embodiments, the screen 1200 includes the webpage that corresponds a user profile managed by LinkedIn with an attached a search box 1206, which can be determined from the URL 1204 of the webpage or the contents of the webpage. After the webpage is displayed, a search query is entered into the search box 1206, and in response a list of search results related to individuals, such as Alex Berman, whose accounts with LinkedIn have data that matches the search query is presented by LinkedIn. Such a search result can then be extracted as relevant data and matched with the digital alliance data. In this example, the individual Alex Berman is identified as a contact of the alliance network of the user account associated with the user device. The matched digital alliance data can then be used to supplement the search result. In this example, certain information from the matched digital alliance data is displayed in an area 1208 next to the location where the original search result is displayed. The certain information describes one or more alliance network members of the user account who have offered digital communications for exploration of relationships involving the individual Alex Berman. The area 1208 is similar to the area 1060 illustrated in FIG. 10D.

Figure 12B:
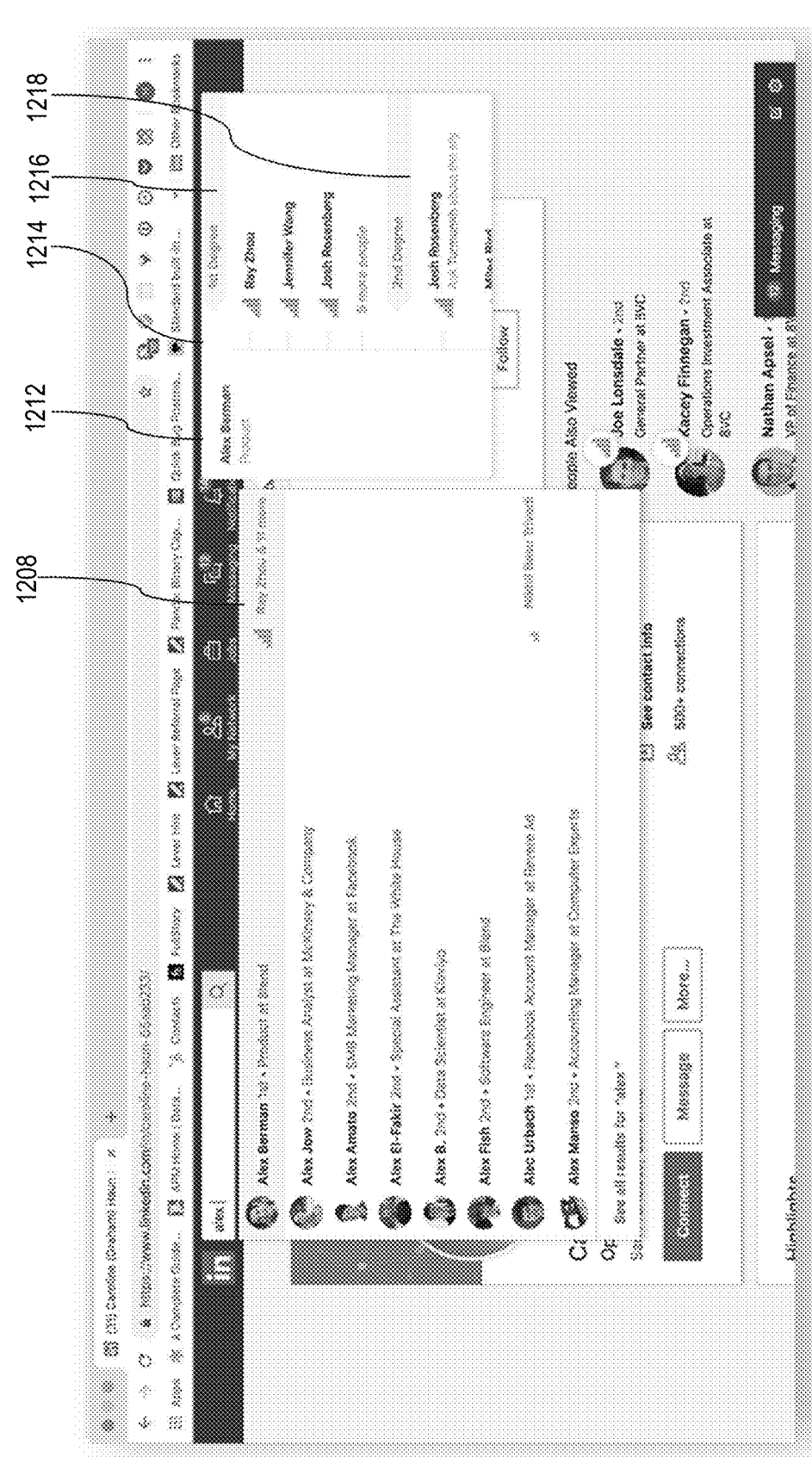
FIG. 12B illustrates the example webpage provided by the social media server with subsequent enhancement made by a user device receiving the webpage.

FIG. 12B illustrates the example webpage provided by the social media server with subsequent enhancement made by a user device receiving the webpage. In some embodiments, in response to a user request, such as moving a cursor over the area 1208, the section 1214 is displayed as an expansion near the area 1208 or in another location. The section 1214 includes a sub-section 1212 showing basic information regarding the contact Alex, such as the job title, and further sub-sections for different groups of alliance network members who have offered digital communications for exploration of relationships involving the contact Alex, such as the sub-section 1216 for first-degree alliance network members and the sub-section 1218 for second-degree alliance network members. The sub-sections 1212, 1216, and 1218 are similar to the sub-sections 924, 926, and 930 illustrated in FIG. 9B, respectively. Therefore, to facilitate communication with the contact Alex, the user associated with the user device may reach out to the user associated with an alliance network member listed in the sub-section 1216, such as Ray Zhou, for an introduction.

Figure 13A:
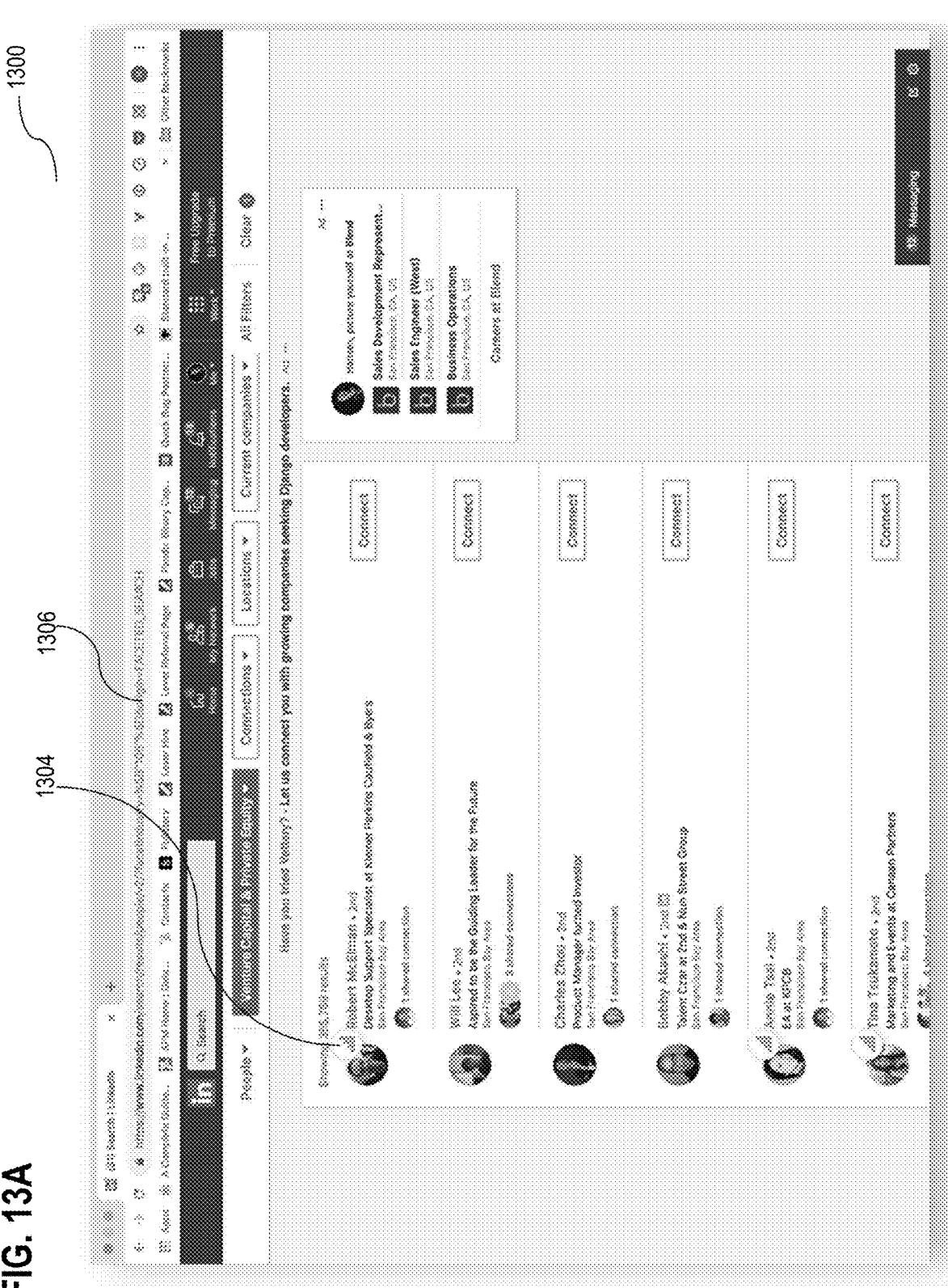
FIG. 13A illustrates an example webpage provided by a social media server with initial enhancement made by a user device receiving the webpage.

FIG. 13A illustrates an example webpage provided by a social media server with initial enhancement made by a user device receiving the webpage. In some embodiments, the screen 1300 includes the webpage that corresponds to a list of search results related to individuals provided by LinkedIn, which can be determined from the URL 1306 of the webpage or the contents of the webpage. Such a search result can then be extracted as relevant data and matched with the digital alliance data. In this example, the list of search results includes a search result related to Robert McElman, who is identified as a contact of the alliance network of the user account associated with the user device. An icon 1304 that shows a summary of the digital alliance data matched to the relevant data is then displayed near the location where information regarding the contact Robert is displayed. The icon 1304 indicates an aggregate communication score over all the communication paths for the user associated with the user device to connect with the contact Robert, for example. The icon 1034 is similar to the icon 1106 illustrated in FIG. 11A.

Figure 13B:
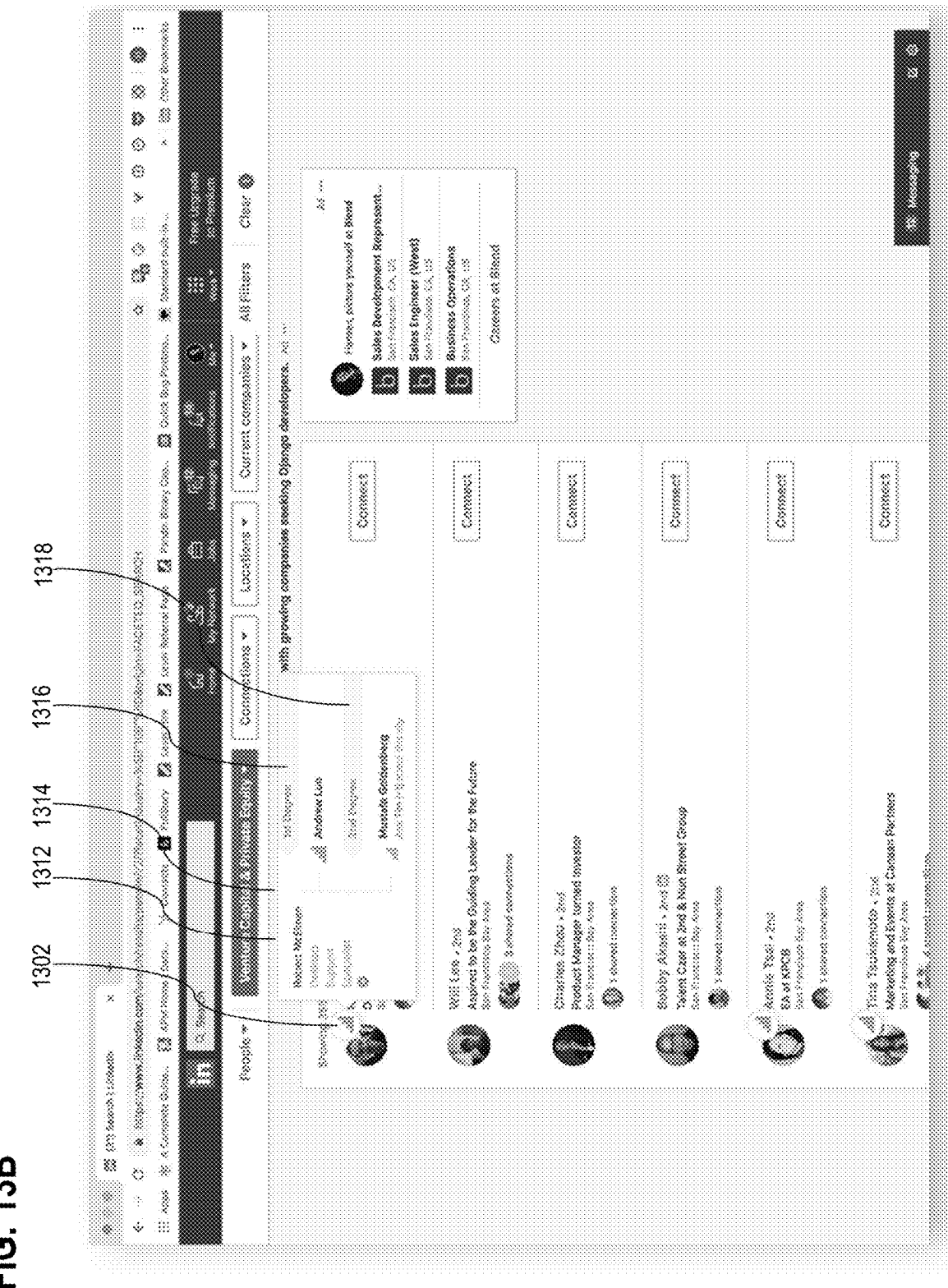
FIG. 13B illustrates the example webpage provided by the social media server with subsequent enhancement made by the user device receiving the webpage.

FIG. 13B illustrates the example webpage provided by the social media server with subsequent enhancement made by the user device receiving the webpage. In some embodiments, in response to a user request, such as moving a cursor over the icon 1304, the section 1314 is displayed as an expansion of the icon 1302 next to the icon 1302 or in another location. The section 1314 includes a sub-section 1312 with basic information regarding the contact Robert and further sub-sections for different groups of alliance network members who have offered digital communications for exploration of relationships involving the contact Robert, such as the sub-section 1316 for first-degree alliance network members and the sub-section 1318 for second-degree alliance network members. The sub-sections 1312, 1316, and 1318 are similar to the sub-sections 924, 926, and 930 illustrated in FIG. 9B, respectively. Therefore, to facilitate communication with the contact Robert, the user associated with the user device may reach out to the user associated with an alliance network member listed in the sub-section 1316, such as Andrew Luo, for an introduction.

5. EXAMPLE PROCESSES

FIG. 8 illustrates an example process performed by the server of managing alliances and associated relationship data alliances. FIG. 14 illustrates an example process performed by a user device via a client program of the communication management server computer of enhancing online contents based on digital alliance data. FIG. 8 and FIG. 14 are each shown in simplified, schematic format for purposes of illustrating a clear example and other embodiments may include more, fewer, or different elements connected in various manners. FIG. 8 and FIG. 14 are each intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In some embodiments, in step 802, the server 102 is programmed or configured to receive a request from an inviter device associated with an inviter to invite an invitee to form an alliance such that the inviter and the invitee offer digital communications from which relationships are to be identified and information regarding the relationships is to be shared with the other. To form an alliance, the initial request or subsequent communications with the server 102 would include credentials for one or more communication accounts of the inviter. The initial request or subsequent communications would also include a selection criterion to be applied to the digital communications in the one or more communication accounts to form a set of digital communications unless all the digital communications in the one or more communication accounts are to be associated with the alliance by default. Furthermore, the initial request or subsequent communications would include a specification of types of information regarding relationships identified from the inviter's set of digital communications unless the name of each contact and a corresponding relationship strength are to be used by default.

In step 804, the server 102 is programmed or configured to send to an invitee device of the invitee an invitation to form the alliance based on the request. Information as to how to reach the invitee device would be included in the request unless the invitee device is already in communication with the server 102. The invitation would include at least a portion of the data in the request, and more data can be sent to the invitee device upon request. The invitation can be sent directly to the invitee device or through a communication account of the invitee.

In step 806, the server 102 is programmed or configured to receive a response to the invite. A response accepting the invitation would typically include information regarding a set of digital communications in one or more communication accounts of the invitee, access to the one or more communication accounts requiring credentials of the invitee. The response or subsequent communications with the server 102 can include the other data required for forming the alliance, similar to those sent to the server 102 by the inviter device.

In step 808, the server 102 is programmed or configured to form an alliance between the inviter and the invitee based on the set of digital communications of the inviter and the invitee. The data required for forming the alliance can be saved in a database. The set of digital communications of the inviter and the invitee can be retrieved, filtered, or mined as soon as the credentials for accessing the communication accounts of the inviter or the invitee are received, according to a specific schedule, or in response to relevant queries. In addition, the server 102 can be configured to ultimately form separate alliances between the inviter device and other devices, and similarly between the invitee device and additional devices.

In step 810, the server 102 is programmed or configured to receive a query for information regarding relationships from the inviter device. The query could also come from the invitee device, and the query processing would be the same except that the roles of the inviter and the invitee are switched. The query could be limited to relationships within certain organizations, which may correspond to prospective customers or employers of the inviter, for example.

In step 812, in response to the query, the server 102 is programmed or configured to determine a specific set of relationships between the invitee and a specific set of individuals (contacts) and corresponding relationship strengths from the set of digital communications of the invitee associated with the alliance. For example, when the invitee chats on a daily basis with a certain individual based on the set of digital communications of the invitee, the corresponding relationship strength might be relatively high. The server 102 can also be configured to determine values of various attributes of each of the specific set of contacts, such as gender, employer, title, location, organization, etc. from the digital communications with the contact, the local database, or external data sources. For example, the title of the contact might be extracted from the signature block of a digital communication of the contact. When the inviter device has formed separate alliances with other devices, the server is configured to also repeat the process with the sets of digital communications of the user accounts associated with those separate alliances. The server 102 can be programmed to further aggregate data regarding the specific set of relationships by industry, organization, or distinct individual.

In step 814, the server 102 is programmed or configured to transmit specific types of information regarding the specific set of relationships to inviter device. The specific types of information by default could be the name of a contact in the relationship and the corresponding relationship, or include additional data, such as headers or summaries of the digital communications, according to the invitee's specification.

Via a client program created by the server, a user device is programmed or configured to perform the following process. In some embodiments, in step 1402, the user device is programmed or configured to receive from a web server a webpage at a first user device associated with a first user and a first user account managed by a communication data management server. The webpage may correspond to a listing of digital communications, a digital communication, a user profile, or a listing of user accounts.

In some embodiments, in step 1404, the user device is programmed or configured to extract a type of data of a plurality types of data from a body or metadata of the webpage. The plurality types of data can include a name of an individual, a name of an organization, an identifier of a communication account, a physical address, a job title, or an identifier of an Internet domain.

In some embodiments, in step 1406, the user device is programmed or configured to determine whether the type of data matches certain data regarding a contact of an alliance network of the first user account. The alliance network comprises one or more user accounts managed by the communication data management server, each of the one or more user accounts as an alliance network member to the first user account sharing relationship information with the first user account through one or more alliances, each alliance comprising two user accounts managed by the communication data management server, each of the two user accounts as an ally of the other user account in the alliance offering a set of digital communications indicating relationships that can be shared with the other user account in the alliance. In addition, the contact is a sender or a receiver of a digital communication in the one or more sets of digital communications offered by an alliance network member of the one or more alliance network members.

In some embodiments, the determining comprises sending a request to the communication data management server, the request including the type of data and user data related to the first user account. The determining further comprises receiving the specific data from the communication data management server.

In some embodiments, when the certain data identifies the contact of the alliance network, the specific data can include additional data describing the contact. When the certain data identifies an organization employing the contact, the specific data can include data related to additional contacts of the alliance network employed by the organization.

In some embodiments, in step 1408, the user device is programmed or configured to update, in response to determining that the type of data matches certain data regarding a contact, the webpage with specific data related to the contact. The specific data can include particular data related to a specific alliance network member that offered a specific digital communication in the one or more sets of digital communications, and the particular data may indicate a communication score of a communication path for the first user to connect with the contact through a user of the specific alliance network member.

In some embodiments, the specific data can also indicate an aggregate measure over all the one or more alliance network members to the first user account who have offered digital communications for exploration of relationships involving the contact. The user device can be further configured to receive a request to expand the specific data and revise, in response to the request, the updated webpage with additional data related to each of the one or more alliance network members to the first user account who have offered digital communications for exploration of relationships involving the contact. The additional data related to a specific alliance network member of the one or more alliance network members can include an aggregate communication score over all communication paths for the first user to connect with the contact through a user associated with the specific alliance network member. Moreover, the additional data can be sorted by aggregate communication score over the one or more of alliance network members.

In some embodiments, in step 1410, the user device is programmed or configured to cause displaying the updated webpage by the first user device.

In some embodiments, the user device is further configured to detect a change to the webpage, extract a second type of data of the plurality types of data from the change, and determine whether the second type of data matches particular data regarding a second contact of the alliance network of the first user account, similar to determining whether the first type of data matches certain data regarding a contact of the alliance network.

6. HARDWARE IMPLEMENTATION

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 15:
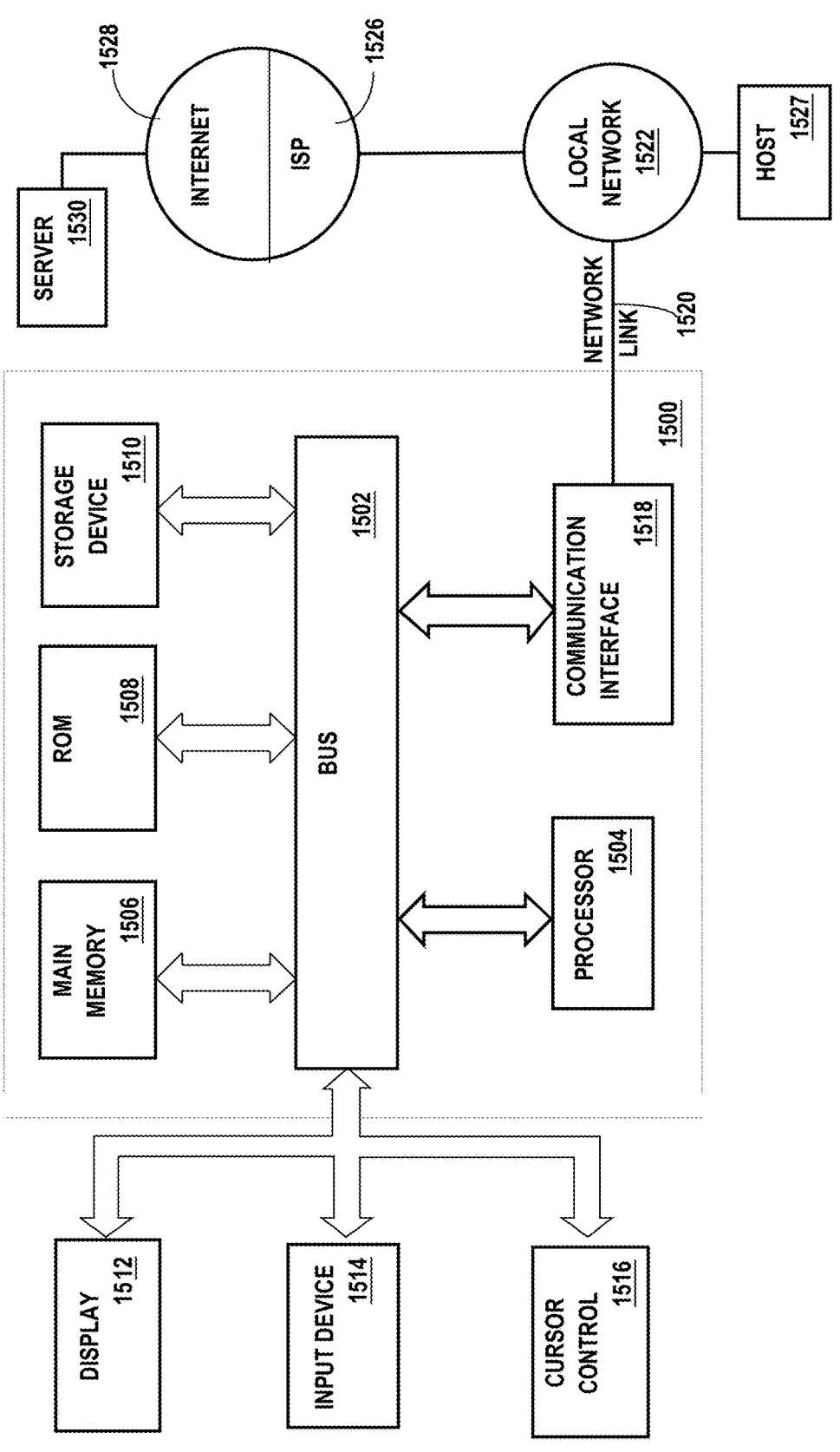
FIG. 15 is a block diagram that illustrates a computer system upon which an embodiment of the invention may be implemented.

For example, FIG. 15 is a block diagram that illustrates a computer system 1500 upon which an embodiment of the invention may be implemented. Computer system 1500 includes a bus 1502 or other communication mechanism for communicating information, and a hardware processor 1504 coupled with bus 1502 for processing information. Hardware processor 1504 may be, for example, a general purpose microprocessor.

Computer system 1500 also includes a main memory 1506, such as a random access memory (RAM) or other dynamic storage device, coupled to bus 1502 for storing information and instructions to be executed by processor

1504. Main memory 1506 also may be used for storing temporary variables or other intermediate information during execution of instructions to be executed by processor 1504. Such instructions, when stored in non-transitory storage media accessible to processor 1504, render computer system 1200 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, such as a magnetic disk, optical disk, or solid-state drive is provided and coupled to bus 1502 for storing information and instructions.

Computer system 1500 may be coupled via bus 1502 to a display 1512, such as a cathode ray tube (CRT), for displaying information to a computer user. An input device 1514, including alphanumeric and other keys, is coupled to bus 1502 for communicating information and command selections to processor 1504. Another type of user input device is cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Computer system 1500 may implement the techniques described herein using customized hard-wired logic, one or more ASICs or FPGAs, firmware and/or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1510. Volatile media includes dynamic memory, such as main memory 1506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid-state drive of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518.

The received code may be executed by processor 1504 as it is received, and/or stored in storage device 1510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory storage media storing instructions which, when executed by one or more processors, cause performance of a method of enhancing online contents based on digital alliance data, the method comprising:

obtaining at least a portion of a webpage at a first user device associated with a first user and a first user account managed by a communication data management server, the webpage being a digital communication between a first communication account of the first user and a second communication account of a second user;

determining an organization associated with the second communication account;

identifying one or more members or contacts of an alliance network of the first user account that are associated with the organization, the alliance network comprising one or more user accounts managed by the communication data management server, each user account of the one or more user accounts as a member of the alliance network sharing relationship information with the first user account through one or more alliances, each alliance comprising two user accounts managed by the communication data management server, each of the two user accounts as an ally of the other user account in the alliance offering a set of private digital communications of a private communication account associated with the user account, the set of private digital communications indicating one or more relationships with one or more individuals other than a user of the other user account in the alliance, information regarding at least one of the one or more relationships being shared with the other user account in the alliance, each contact of the alliance network being a sender or a receiver of a digital communication in the one or more sets of private digital communications offered by a member of the one or more members;

updating the webpage with specific data regarding the one or more members or contacts of the alliance network to obtain an updated webpage;

causing displaying the updated webpage by the first user device.

2. The one or more non-transitory storage media of claim 1, the webpage including an identifier of the second communication account, determining the organization comprising extracting a domain name from the identifier.

3. The one or more non-transitory storage media of claim 1, the method further comprising:

identifying a list of related organizations related to the organization;

updating the webpage with certain data including the list of related organizations as part of the updated webpage.

4. The one or more non-transitory storage media of claim 3, the method further comprising:

identifying a set of members of the alliance network who have offered digital communications for exploration of relationships involving an individual employed by a certain organization of the list of related organizations, the certain data including additional data regarding the set of members.

5. The one or more non-transitory storage media of claim 3, the list of related organization including a subsidiary of the organization.

6. The one or more non-transitory storage media of claim 3, the method further comprising identifying a set of contacts of the alliance network who are employed by a certain organization of the list of related organizations based on public data or from the webpage.

7. The one or more non-transitory storage media of claim 6, the certain data being sorted by a number of alliances required from the first user account to reach a first contact of the set of contacts.

8. The one or more non-transitory storage media of claim 6, the method further comprising:

receiving a request to expand the certain data;

revising, in response to the request, the updated webpage with an indicator of a strength of a relationship between a user of a member of the alliance network and a first contact of the set of contacts.

9. The one or more non-transitory storage media of claim 6, the certain data indicating an aggregate communication score over all communication paths in the alliance network for the first user to connect with a contact of the set of contacts through a user of a member of the alliance network.

10. The one or more non-transitory storage media of claim 1, the method further comprising updating the webpage to present an option for adding the one or more members or contacts into a list for future retrieval.

11. A method of enhancing online contents based on digital alliance data, comprising:

transmitting to a remote device instructions which when executed cause one or more processors to perform:

obtaining at least a portion of a webpage at a first user device associated with a first user and a first user account managed by a communication data management server, the webpage being a digital communication between a first communication account of the first user and a second communication account of a second user;

determining an organization associated with the second communication account;

identifying one or more members or contacts of an alliance network of the first user account that are associated with the organization, the alliance network comprising one or more user accounts managed by the communication data management server, each user account of the one or more user accounts as a member of the alliance network sharing relationship information with the first user account through one or more alliances, each alliance comprising two user accounts managed by the communication data management server, each of the two user accounts as an ally of the other user account in the alliance offering a set of private digital communications of a private communication account associated with the user account, the set of private digital communications indicating one or more relationships with one or more individuals other than a user of the other user account in the alliance, information regarding at least one of the one or more relationships being shared with the other user account in the alliance, each contact of the alliance network being a sender or a receiver of a digital communication in the one or more sets of private digital communications offered by a member of the one or more members;

updating the webpage with specific data regarding the one or more members or contacts of the alliance network to obtain an updated webpage;

causing displaying the updated webpage by the first user device.

12. The method of claim 11, the webpage including an identifier of the second communication account, determining the organization comprising extracting a domain name from the identifier.

13. The method of claim 11, the instructions when executed causing the one or more processors to further perform:

identifying a list of related organizations related to the organization;

updating the webpage with certain data including the list of related organizations as part of the updated webpage.

14. The method of claim 13, the instructions when executed causing the one or more processors to further perform:

identifying a set of members of the alliance network who have offered digital communications for exploration of relationships involving an individual employed by a certain organization of the list of related organizations, the certain data including additional data regarding the set of members.

15. The method of claim 13, the list of related organization including a subsidiary of the organization.

16. The method of claim 13, the instructions when executed causing the one or more processors to further perform identifying a set of contacts of the alliance network who are employed by a certain organization of the list of related organizations based on public data or from the webpage.

17. The method of claim 16, the certain data being sorted by a number of alliances required from the first user account to reach a first contact of the set of contacts.

18. The method of claim 16, the instructions when executed causing the one or more processors to further perform:

receiving a request to expand the certain data;

revising, in response to the request, the updated webpage with an indicator of a strength of a relationship between a user of a member of the alliance network and a first contact of the set of contacts.

19. The method of claim 16, the certain data indicating an aggregate communication score over all communication paths in the alliance network for the first user to connect with a contact of the set of contacts through a user of a member of the alliance network.

20. The method of claim 11, the instructions when executed causing the one or more processors to further perform updating the webpage to present an option for adding the one or more members or contacts into a list for future retrieval.

* * * * *